United States Patent
Gass

(10) Patent No.: US 8,087,438 B2
(45) Date of Patent: Jan. 3, 2012

(54) DETECTION SYSTEMS FOR POWER EQUIPMENT

(75) Inventor: Stephen F. Gass, West Linn, OR (US)

(73) Assignee: SD3, LLC, Tualatin, OR (US)

( * ) Notice: Subject to any disclaimer, the term of this patent is extended or adjusted under 35 U.S.C. 154(b) by 0 days.

(21) Appl. No.: 12/799,915

(22) Filed: May 3, 2010

(65) Prior Publication Data
US 2011/0061769 A1 Mar. 17, 2011

Related U.S. Application Data

(63) Continuation of application No. 12/322,069, filed on Jan. 26, 2009, now Pat. No. 7,707,918, which is a continuation of application No. 11/107,499, filed on Apr. 15, 2005, now Pat. No. 7,481,140, application No. 12/799,915, which is a continuation of application No. 12/454,569, filed on May 18, 2009, now Pat. No. 7,991,503, which is a continuation of application No. 11/027,600, filed on Dec. 31, 2004, now Pat. No. 7,536,238.

(60) Provisional application No. 60/533,791, filed on Dec. 31, 2003.

(51) Int. Cl.
*B23Q 15/00* (2006.01)
(52) U.S. Cl. ............ 144/382; 144/383; 83/72; 700/177
(58) Field of Classification Search ............... 700/21, 700/79, 177; 83/72, 79; 702/65, 187; 318/445; 144/427, 382, 383; 173/1
See application file for complete search history.

(56) References Cited

U.S. PATENT DOCUMENTS

| | | | |
|---|---|---|---|
| 146,886 A | 1/1874 | Doane et al. |
| 162,814 A | 5/1875 | Graves et al. |
| 261,090 A | 7/1882 | Grill |
| 264,412 A | 9/1882 | Kuhlmann |
| 299,480 A | 5/1884 | Kuhlman et al. |
| 302,041 A | 7/1884 | Sill |
| 307,112 A | 10/1884 | Groff |
| 509,253 A | 11/1893 | Shields |
| 545,504 A | 9/1895 | Hoover |
| 869,513 A | 10/1907 | Pfeil |
| 941,726 A | 11/1909 | Pfalzgraf |
| 997,720 A | 7/1911 | Troupenat |
| 1,037,843 A | 9/1912 | Ackley |

(Continued)

FOREIGN PATENT DOCUMENTS

CH 297525 6/1954

(Continued)

OTHER PUBLICATIONS

Skil Model 3400-Type 1 10" Table Saw Parts List and Technical Bulletin, S-B Power Tool Company, Jun. 1993.

(Continued)

*Primary Examiner* — Charles Kasenge

(57) ABSTRACT

Methods to detect when a human body contacts a predetermined portion of a machine are disclosed. The methods distinguish contact with a person from contact with other materials. The methods are particularly applicable in woodworking equipment such as power saws to distinguish contact between a person and the blade of the saw from contact between the blade and wet or green wood. Woodworking machines and memory devices for use in woodworking machines having safety systems designed to detect a dangerous condition between a human and a dangerous portion of the woodworking machine and to trigger some action to mitigate the dangerous condition are also disclosed.

9 Claims, 23 Drawing Sheets

U.S. PATENT DOCUMENTS

| | | |
|---|---|---|
| 1,050,649 A | 1/1913 | Harrold et al. |
| 1,054,558 A | 2/1913 | Jones |
| 1,074,198 A | 9/1913 | Phillips |
| 1,082,870 A | 12/1913 | Humason |
| 1,101,515 A | 6/1914 | Adam |
| 1,126,970 A | 2/1915 | Folmer |
| 1,132,129 A | 3/1915 | Stevens |
| 1,148,169 A | 7/1915 | Howe |
| 1,154,209 A | 9/1915 | Rushton |
| 1,205,246 A | 11/1916 | Mowry |
| 1,228,047 A | 5/1917 | Reinhold |
| 1,240,430 A | 9/1917 | Erickson |
| 1,244,187 A | 10/1917 | Frisbie |
| 1,255,886 A | 2/1918 | Jones |
| 1,258,961 A | 3/1918 | Tattersall |
| 1,311,508 A | 7/1919 | Harrold |
| 1,324,136 A | 12/1919 | Turner |
| 1,381,612 A | 6/1921 | Anderson |
| 1,397,606 A | 11/1921 | Smith |
| 1,427,005 A | 8/1922 | McMichael |
| 1,430,983 A | 10/1922 | Granberg |
| 1,450,906 A | 4/1923 | Anderson |
| 1,464,924 A | 8/1923 | Drummond |
| 1,465,224 A | 8/1923 | Lantz |
| 1,496,212 A | 6/1924 | French |
| 1,511,797 A | 10/1924 | Berghold |
| 1,526,128 A | 2/1925 | Flohr |
| 1,527,587 A | 2/1925 | Hutchinson |
| 1,551,900 A | 9/1925 | Morrow |
| 1,553,996 A | 9/1925 | Federer |
| 1,582,483 A | 4/1926 | Runyan |
| 1,590,988 A | 6/1926 | Campbell |
| 1,600,604 A | 9/1926 | Sorlien |
| 1,616,478 A | 2/1927 | Watson |
| 1,640,517 A | 8/1927 | Procknow |
| 1,662,372 A | 3/1928 | Ward |
| 1,701,948 A | 2/1929 | Crowe |
| 1,711,490 A | 5/1929 | Drummond |
| 1,712,828 A | 5/1929 | Klehm |
| 1,774,521 A | 9/1930 | Neighbour |
| 1,807,120 A | 5/1931 | Lewis |
| 1,811,066 A | 6/1931 | Tannewitz |
| 1,879,280 A | 9/1932 | James |
| 1,896,924 A | 2/1933 | Ulrich |
| 1,902,270 A | 3/1933 | Tate |
| 1,904,005 A | 4/1933 | Masset |
| 1,910,651 A | 5/1933 | Tautz |
| 1,938,548 A | 12/1933 | Tautz |
| 1,938,549 A | 12/1933 | Tautz |
| 1,963,688 A | 6/1934 | Tautz |
| 1,988,102 A | 1/1935 | Woodward |
| 1,993,219 A | 3/1935 | Merrigan |
| 2,007,887 A | 7/1935 | Tautz |
| 2,010,851 A | 8/1935 | Drummond |
| 2,020,222 A | 11/1935 | Tautz |
| 2,038,810 A | 4/1936 | Tautz |
| 2,075,282 A | 3/1937 | Hedgpeth |
| 2,095,330 A | 10/1937 | Hedgpeth |
| 2,106,288 A | 1/1938 | Tautz |
| 2,106,321 A | 1/1938 | Guertin |
| 2,121,069 A | 6/1938 | Collins |
| 2,131,492 A | 9/1938 | Ocenasek |
| 2,163,320 A | 6/1939 | Hammond |
| 2,168,282 A | 8/1939 | Tautz |
| 2,241,556 A | 5/1941 | MacMillin et al. |
| 2,261,696 A | 11/1941 | Ocenasek |
| 2,265,407 A | 12/1941 | Tautz |
| 2,286,589 A | 6/1942 | Tannewitz |
| 2,292,872 A | 8/1942 | Eastman |
| 2,299,262 A | 10/1942 | Uremovich |
| 2,312,118 A | 2/1943 | Neisewander |
| 2,313,686 A | 3/1943 | Uremovich |
| 2,328,244 A | 8/1943 | Woodward |
| 2,352,235 A | 6/1944 | Tautz |
| 2,377,265 A | 3/1945 | Rady |
| 2,392,486 A | 1/1946 | Larsen |
| 2,402,232 A | 6/1946 | Baker |
| 2,425,331 A | 8/1947 | Kramer |
| 2,434,174 A | 1/1948 | Morgan |
| 2,452,589 A | 11/1948 | McWhirter et al. |
| 2,466,325 A | 4/1949 | Ocenasek |
| 2,496,613 A | 2/1950 | Woodward |
| 2,509,813 A | 5/1950 | Dineen |
| 2,517,649 A | 8/1950 | Frechtmann |
| 2,518,684 A | 8/1950 | Harris |
| 2,530,290 A | 11/1950 | Collins |
| 2,554,124 A | 5/1951 | Salmont |
| 2,562,396 A | 7/1951 | Schutz |
| 2,572,326 A | 10/1951 | Evans |
| 2,590,035 A | 3/1952 | Pollak |
| 2,593,596 A | 4/1952 | Olson |
| 2,601,878 A | 7/1952 | Anderson |
| 2,623,555 A | 12/1952 | Eschenburg |
| 2,625,966 A | 1/1953 | Copp |
| 2,626,639 A | 1/1953 | Hess |
| 2,661,777 A | 12/1953 | Hitchcock |
| 2,661,780 A | 12/1953 | Morgan |
| 2,675,707 A | 4/1954 | Brown |
| 2,678,071 A | 5/1954 | Odlum et al. |
| 2,690,084 A | 9/1954 | Van Dam |
| 2,695,638 A | 11/1954 | Gaskell |
| 2,704,560 A | 3/1955 | Woessner |
| 2,711,762 A | 6/1955 | Gaskell |
| 2,722,246 A | 11/1955 | Arnoldy |
| 2,731,049 A | 1/1956 | Akin |
| 2,736,348 A | 2/1956 | Nelson |
| 2,737,213 A | 3/1956 | Richards et al. |
| 2,758,615 A | 8/1956 | Mastriforte |
| 2,785,710 A | 3/1957 | Mowery, Jr |
| 2,786,496 A | 3/1957 | Eschenburg |
| 2,810,408 A | 10/1957 | Boice et al. |
| 2,839,943 A | 6/1958 | Caldwell et al. |
| 2,844,173 A | 7/1958 | Gaskell |
| 2,850,054 A | 9/1958 | Eschenburg |
| 2,852,047 A | 9/1958 | Odlum et al. |
| 2,873,773 A | 2/1959 | Gaskell |
| 2,876,809 A | 3/1959 | Rentsch et al. |
| 2,883,486 A | 4/1959 | Mason |
| 2,894,546 A | 7/1959 | Eschenburg |
| 2,913,025 A | 11/1959 | Richards |
| 2,913,581 A | 11/1959 | Simonton et al. |
| 2,945,516 A | 7/1960 | Edgemond, Jr. et al. |
| 2,954,118 A | 9/1960 | Anderson |
| 2,957,166 A | 10/1960 | Gluck |
| 2,978,084 A | 4/1961 | Vilkaitis |
| 2,984,268 A | 5/1961 | Vuichard |
| 2,991,593 A | 7/1961 | Cohen |
| 3,005,477 A | 10/1961 | Sherwen |
| 3,011,529 A | 12/1961 | Copp |
| 3,011,610 A | 12/1961 | Stiebel et al. |
| 3,013,592 A | 12/1961 | Ambrosio et al. |
| 3,021,881 A | 2/1962 | Edgemond, Jr. et al. |
| 3,035,995 A | 5/1962 | Seeley et al. |
| 3,047,116 A | 7/1962 | Stiebel et al. |
| 3,085,602 A | 4/1963 | Gaskell |
| 3,105,530 A | 10/1963 | Peterson |
| 3,129,731 A | 4/1964 | Tyrrell |
| 3,163,732 A | 12/1964 | Abbott |
| 3,184,001 A | 5/1965 | Reinsch et al. |
| 3,186,256 A | 6/1965 | Reznick |
| 3,207,273 A | 9/1965 | Jurin |
| 3,213,731 A | 10/1965 | Renard |
| 3,224,474 A | 12/1965 | Bloom |
| 3,232,326 A | 2/1966 | Speer et al. |
| 3,246,205 A | 4/1966 | Miller |
| 3,249,134 A | 5/1966 | Vogl et al. |
| 3,276,497 A | 10/1966 | Heer |
| 3,306,149 A | 2/1967 | John |
| 3,313,185 A | 4/1967 | Drake et al. |
| 3,315,715 A | 4/1967 | Mytinger |
| 3,323,814 A | 6/1967 | Phillips |
| 3,337,008 A | 8/1967 | Trachte |
| 3,356,111 A | 12/1967 | Mitchell |
| 3,386,322 A | 6/1968 | Stone et al. |
| 3,439,183 A | 4/1969 | Hurst, Jr |
| 3,445,835 A | 5/1969 | Fudaley |
| 3,454,286 A | 7/1969 | Anderson et al. |

| | | | | | | |
|---|---|---|---|---|---|---|
| 3,456,696 A | 7/1969 | Gregory et al. | | 4,249,117 A * | 2/1981 | Leukhardt et al. ............ 318/275 |
| 3,512,440 A | 5/1970 | Frydmann | | 4,249,442 A | 2/1981 | Fittery |
| 3,538,964 A | 11/1970 | Warrick et al. | | 4,262,278 A | 4/1981 | Howard et al. |
| 3,540,338 A | 11/1970 | McEwan et al. | | 4,267,914 A | 5/1981 | Saar |
| 3,554,067 A | 1/1971 | Scutella | | 4,270,427 A | 6/1981 | Colberg et al. |
| 3,566,996 A | 3/1971 | Crossman | | 4,276,459 A | 6/1981 | Willett et al. |
| 3,580,376 A | 5/1971 | Loshbough | | 4,276,799 A | 7/1981 | Muehling |
| 3,581,784 A | 6/1971 | Warrick et al. | | 4,291,794 A | 9/1981 | Bauer |
| 3,593,266 A | 7/1971 | Van Sickle | | 4,305,442 A | 12/1981 | Currie |
| 3,613,748 A | 10/1971 | De Pue | | 4,319,146 A | 3/1982 | Wires, Sr. |
| 3,621,894 A | 11/1971 | Niksich | | 4,321,841 A | 3/1982 | Felix |
| 3,626,796 A | 12/1971 | Pearl | | 4,325,421 A | 4/1982 | Janovick et al. |
| 3,670,788 A | 6/1972 | Pollak et al. | | 4,372,202 A | 2/1983 | Cameron |
| 3,675,444 A | 7/1972 | Whipple | | 4,391,358 A | 7/1983 | Haeger |
| 3,680,609 A | 8/1972 | Menge | | 4,418,597 A | 12/1983 | Krusemark et al. |
| 3,688,815 A | 9/1972 | Ridenour | | 4,427,042 A | 1/1984 | Mitchell et al. |
| 3,695,116 A | 10/1972 | Baur | | 4,453,112 A | 6/1984 | Sauer et al. |
| 3,696,844 A | 10/1972 | Bernatschek | | 4,466,170 A | 8/1984 | Davis |
| 3,716,113 A | 2/1973 | Kobayashi et al. | | 4,466,233 A | 8/1984 | Thesman |
| 3,719,103 A | 3/1973 | Streander | | 4,470,046 A | 9/1984 | Betsill |
| 3,745,546 A | 7/1973 | Struger et al. | | 4,510,489 A | 4/1985 | Anderson, III et al. |
| 3,749,933 A | 7/1973 | Davidson | | 4,512,224 A | 4/1985 | Terauchi |
| 3,754,493 A | 8/1973 | Niehaus et al. | | 4,518,043 A | 5/1985 | Anderson et al. |
| 3,772,590 A | 11/1973 | Mikulecky et al. | | 4,532,501 A | 7/1985 | Hoffman |
| 3,785,230 A | 1/1974 | Lokey | | 4,532,844 A | 8/1985 | Chang et al. |
| 3,793,915 A | 2/1974 | Hujer | | 4,557,168 A | 12/1985 | Tokiwa |
| 3,805,639 A | 4/1974 | Peter | | 4,559,858 A | 12/1985 | Laskowski et al. |
| 3,805,658 A | 4/1974 | Scott et al. | | 4,560,033 A | 12/1985 | DeWoody et al. |
| 3,808,932 A | 5/1974 | Russell | | 4,566,512 A | 1/1986 | Wilson |
| 3,829,850 A | 8/1974 | Guetersloh | | 4,573,556 A | 3/1986 | Andreasson |
| 3,829,970 A | 8/1974 | Anderson | | 4,576,073 A | 3/1986 | Stinson |
| 3,858,095 A | 12/1974 | Friemann et al. | | 4,589,047 A | 5/1986 | Gaus et al. |
| 3,861,016 A | 1/1975 | Johnson et al. | | 4,589,860 A | 5/1986 | Brandenstein et al. |
| 3,863,208 A | 1/1975 | Balban | | 4,599,597 A | 7/1986 | Rotbart |
| 3,880,032 A | 4/1975 | Green | | 4,599,927 A | 7/1986 | Eccardt et al. |
| 3,882,744 A | 5/1975 | McCarroll | | 4,606,251 A | 8/1986 | Boileau |
| 3,886,413 A | 5/1975 | Dow et al. | | 4,615,247 A | 10/1986 | Berkeley |
| 3,889,567 A | 6/1975 | Sato et al. | | 4,621,300 A | 11/1986 | Summerer |
| 3,922,785 A | 12/1975 | Fushiya | | 4,625,604 A | 12/1986 | Handler et al. |
| 3,924,688 A | 12/1975 | Cooper et al. | | 4,637,188 A | 1/1987 | Crothers |
| 3,931,727 A | 1/1976 | Luenser | | 4,637,289 A | 1/1987 | Ramsden |
| 3,935,777 A | 2/1976 | Bassett | | 4,644,832 A * | 2/1987 | Smith ............................... 83/72 |
| 3,945,286 A | 3/1976 | Smith | | 4,653,189 A | 3/1987 | Andreasson |
| 3,946,631 A | 3/1976 | Malm | | 4,657,428 A | 4/1987 | Wiley |
| 3,947,734 A | 3/1976 | Fyler | | 4,672,500 A | 6/1987 | Tholome et al. |
| 3,949,636 A | 4/1976 | Ball et al. | | 4,675,664 A | 6/1987 | Cloutier et al. |
| 3,953,770 A | 4/1976 | Hayashi | | 4,679,719 A | 7/1987 | Kramer |
| 3,960,310 A | 6/1976 | Nussbaum | | 4,718,229 A | 1/1988 | Riley |
| 3,967,161 A | 6/1976 | Lichtblau | | 4,722,021 A | 1/1988 | Hornung et al. |
| 3,974,565 A | 8/1976 | Ellis | | 4,751,603 A | 6/1988 | Kwan |
| 3,975,600 A | 8/1976 | Marston | | 4,756,220 A | 7/1988 | Olsen et al. |
| 3,978,624 A | 9/1976 | Merkel et al. | | 4,757,881 A | 7/1988 | Jonsson et al. |
| 3,994,192 A | 11/1976 | Faig | | 4,774,866 A | 10/1988 | Dehari et al. |
| 4,007,679 A | 2/1977 | Edwards | | 4,792,965 A | 12/1988 | Morgan |
| 4,016,490 A | 4/1977 | Weckenmann et al. | | 4,805,504 A | 2/1989 | Fushiya et al. |
| 4,026,174 A | 5/1977 | Fierro | | 4,831,279 A | 5/1989 | Ingraham |
| 4,026,177 A | 5/1977 | Lokey | | 4,840,135 A | 6/1989 | Yamauchi |
| 4,029,159 A | 6/1977 | Nymann | | 4,845,476 A | 7/1989 | Rangeard et al. |
| 4,047,156 A | 9/1977 | Atkins | | 4,864,455 A | 9/1989 | Shimomura et al. |
| 4,048,886 A | 9/1977 | Zettler | | 4,875,398 A | 10/1989 | Taylor et al. |
| 4,060,160 A | 11/1977 | Lieber | | 4,896,607 A | 1/1990 | Hall et al. |
| 4,070,940 A | 1/1978 | McDaniel et al. | | 4,906,962 A | 3/1990 | Duimstra |
| 4,075,961 A | 2/1978 | Harris | | 4,907,679 A | 3/1990 | Menke |
| 4,077,161 A | 3/1978 | Wyle et al. | | 4,934,233 A | 6/1990 | Brundage et al. |
| 4,085,303 A | 4/1978 | McIntyre et al. | | 4,936,876 A | 6/1990 | Reyes |
| 4,090,345 A | 5/1978 | Harkness | | 4,937,554 A | 6/1990 | Herman |
| 4,091,698 A | 5/1978 | Obear et al. | | 4,964,450 A | 10/1990 | Hughes et al. |
| 4,106,378 A | 8/1978 | Kaiser | | 4,965,909 A | 10/1990 | McCullough et al. |
| 4,117,752 A | 10/1978 | Yoneda | | 4,975,798 A | 12/1990 | Edwards et al. |
| 4,145,940 A | 3/1979 | Woloveke et al. | | 5,020,406 A | 6/1991 | Sasaki et al. |
| 4,152,833 A | 5/1979 | Phillips | | 5,025,175 A | 6/1991 | Dubois, III |
| 4,161,649 A | 7/1979 | Klos et al. | | 5,042,348 A | 8/1991 | Brundage et al. |
| 4,169,990 A | 10/1979 | Lerdman | | 5,046,426 A | 9/1991 | Julien et al. |
| 4,175,452 A | 11/1979 | Idel | | 5,052,255 A | 10/1991 | Gaines |
| 4,190,000 A | 2/1980 | Shaull et al. | | 5,074,047 A | 12/1991 | King |
| 4,195,722 A | 4/1980 | Anderson et al. | | 5,081,406 A | 1/1992 | Hughes et al. |
| 4,199,930 A | 4/1980 | Lebet et al. | | 5,082,316 A | 1/1992 | Wardlaw |
| 4,206,666 A | 6/1980 | Ashton | | 5,083,973 A | 1/1992 | Townsend |
| 4,206,910 A | 6/1980 | Biesemeyer | | 5,086,890 A | 2/1992 | Turczyn et al. |

| | | | | | |
|---|---|---|---|---|---|
| 5,094,000 A | 3/1992 | Becht et al. | 5,819,619 A | 10/1998 | Miller et al. |
| 5,116,249 A | 5/1992 | Shiotani et al. | 5,828,195 A | 10/1998 | Zalesski |
| 5,119,555 A | 6/1992 | Johnson | 5,852,951 A | 12/1998 | Santi |
| 5,122,091 A | 6/1992 | Townsend | 5,857,507 A | 1/1999 | Puzio et al. |
| 5,174,349 A | 12/1992 | Svetlik et al. | 5,861,809 A | 1/1999 | Eckstein et al. |
| 5,184,534 A | 2/1993 | Lee | 5,875,698 A | 3/1999 | Ceroll et al. |
| 5,198,702 A | 3/1993 | McCullough et al. | 5,880,954 A | 3/1999 | Thomson et al. |
| 5,199,343 A | 4/1993 | OBanion | 5,921,367 A | 7/1999 | Kashioka et al. |
| 5,201,110 A | 4/1993 | Bane | 5,927,857 A | 7/1999 | Ceroll et al. |
| 5,201,684 A | 4/1993 | DeBois, III | 5,930,096 A | 7/1999 | Kim |
| 5,202,616 A | 4/1993 | Peters et al. | 5,937,720 A | 8/1999 | Itzov |
| 5,206,625 A | 4/1993 | Davis | 5,942,975 A | 8/1999 | Sorensen |
| 5,207,253 A | 5/1993 | Hoshino et al. | 5,943,932 A | 8/1999 | Sberveglieri |
| 5,212,621 A | 5/1993 | Panter | 5,950,514 A | 9/1999 | Benedict et al. |
| 5,218,189 A | 6/1993 | Hutchison | 5,963,173 A | 10/1999 | Lian et al. |
| 5,231,359 A | 7/1993 | Masuda et al. | 5,974,927 A | 11/1999 | Tsune |
| 5,231,906 A | 8/1993 | Kogej | 5,989,116 A | 11/1999 | Johnson et al. |
| 5,239,978 A | 8/1993 | Plangetis | 6,009,782 A | 1/2000 | Tajima et al. |
| 5,245,879 A | 9/1993 | McKeon | 6,018,284 A | 1/2000 | Rival et al. |
| 5,251,142 A | 10/1993 | Cramer | 6,037,729 A | 3/2000 | Woods et al. |
| 5,257,570 A | 11/1993 | Shiotani et al. | D42,229 S | 4/2000 | Welsh et al. |
| 5,265,510 A | 11/1993 | Hoyer-Ellefsen | 6,052,884 A | 4/2000 | Steckler et al. |
| 5,272,946 A | 12/1993 | McCullough et al. | 6,062,121 A | 5/2000 | Ceroll et al. |
| 5,276,431 A | 1/1994 | Piccoli et al. | 6,070,484 A | 6/2000 | Sakamaki |
| 5,285,708 A | 2/1994 | Bosten et al. | 6,095,092 A | 8/2000 | Chou |
| 5,293,802 A | 3/1994 | Shiotani et al. | 6,112,785 A | 9/2000 | Yu |
| 5,320,382 A | 6/1994 | Goldstein et al. | 6,119,984 A | 9/2000 | Devine |
| 5,321,230 A | 6/1994 | Shanklin et al. | 6,131,629 A | 10/2000 | Puzio et al. |
| 5,331,875 A | 7/1994 | Mayfield | 6,133,818 A | 10/2000 | Shieh et al. |
| 5,353,670 A | 10/1994 | Metzger, Jr. | 6,141,192 A | 10/2000 | Garzon |
| 5,357,179 A | 10/1994 | Abbagnaro et al. | 6,148,504 A | 11/2000 | Schmidt et al. |
| 5,377,554 A | 1/1995 | Reulein et al. | 6,148,703 A | 11/2000 | Ceroll et al. |
| 5,377,571 A | 1/1995 | Josephs | 6,150,826 A | 11/2000 | Hokodate et al. |
| 5,392,568 A | 2/1995 | Howard, Jr. et al. | 6,161,459 A | 12/2000 | Ceroll et al. |
| 5,392,678 A | 2/1995 | Sasaki et al. | 6,170,370 B1 | 1/2001 | Sommerville |
| 5,401,928 A | 3/1995 | Kelley | 6,236,177 B1 | 5/2001 | Zick et al. |
| 5,411,221 A | 5/1995 | Collins et al. | 6,244,149 B1 | 6/2001 | Ceroll et al. |
| 5,422,551 A | 6/1995 | Takeda et al. | 6,250,190 B1 | 6/2001 | Ceroll et al. |
| 5,423,232 A | 6/1995 | Miller et al. | 6,257,061 B1 | 7/2001 | Nonoyama et al. |
| 5,436,613 A | 7/1995 | Ghosh et al. | 6,289,767 B1 | 9/2001 | Cookson |
| 5,447,085 A | 9/1995 | Gochnauer | 6,325,195 B1 | 12/2001 | Doherty |
| 5,451,750 A | 9/1995 | An | 6,330,848 B1 | 12/2001 | Nishio et al. |
| 5,453,903 A | 9/1995 | Chow | 6,336,273 B1 | 1/2002 | Nilsson et al. |
| 5,471,888 A | 12/1995 | McCormick | 6,352,137 B1 | 3/2002 | Stegall et al. |
| 5,480,009 A | 1/1996 | Wieland et al. | 6,357,328 B1 | 3/2002 | Ceroll et al. |
| 5,481,167 A | 1/1996 | Rohrbaugh et al. | 6,366,099 B1 | 4/2002 | Reddi |
| 5,503,059 A | 4/1996 | Pacholok | 6,376,939 B1 | 4/2002 | Suzuki et al. |
| 5,510,587 A | 4/1996 | Reiter | 6,404,098 B1 | 6/2002 | Kayama et al. |
| 5,510,685 A | 4/1996 | Grasselli | 6,405,624 B2 | 6/2002 | Sutton |
| 5,513,548 A | 5/1996 | Garuglieri | 6,418,829 B1 | 7/2002 | Pilchowski |
| 5,531,147 A | 7/1996 | Serban | 6,420,814 B1 | 7/2002 | Bobbio |
| 5,534,836 A | 7/1996 | Schenkel et al. | 6,427,570 B1 | 8/2002 | Miller et al. |
| 5,572,916 A | 11/1996 | Takano | 6,430,007 B1 | 8/2002 | Jabbari |
| 5,587,618 A | 12/1996 | Hathaway | 6,431,425 B1 | 8/2002 | Moorman et al. |
| 5,592,353 A | 1/1997 | Shinohara et al. | 6,450,077 B1 | 9/2002 | Ceroll et al. |
| 5,596,253 A | 1/1997 | Mizuta et al. | 6,453,786 B1 | 9/2002 | Ceroll et al. |
| 5,606,889 A | 3/1997 | Bielinski et al. | 6,460,442 B2 | 10/2002 | Talesky et al. |
| 5,619,896 A | 4/1997 | Chen | 6,471,106 B1 | 10/2002 | Reining |
| 5,623,860 A | 4/1997 | Schoene et al. | 6,479,958 B1 | 11/2002 | Thompson et al. |
| 5,647,258 A | 7/1997 | Brazell et al. | 6,484,614 B1 | 11/2002 | Huang |
| 5,648,644 A | 7/1997 | Nagel | D46,691 S | 12/2002 | Ceroll et al. |
| 5,659,454 A | 8/1997 | Vermesse | 6,492,802 B1 | 12/2002 | Bielski |
| 5,667,152 A | 9/1997 | Mooring | 6,499,224 B1 | 12/2002 | Asick |
| 5,671,633 A | 9/1997 | Wagner | D46,935 S | 1/2003 | Curtsinger |
| 5,695,306 A | 12/1997 | Nygren, Jr. | 6,502,493 B1 | 1/2003 | Eccardt et al. |
| 5,700,165 A | 12/1997 | Harris et al. | 6,536,536 B1 | 3/2003 | Gass et al. |
| 5,722,308 A | 3/1998 | Ceroll et al. | 6,543,324 B2 | 4/2003 | Dils |
| 5,724,875 A | 3/1998 | Meredith et al. | 6,546,835 B2 | 4/2003 | Wang |
| 5,730,165 A | 3/1998 | Philipp | 6,564,909 B1 | 5/2003 | Razzano |
| 5,741,048 A | 4/1998 | Eccleston | 6,575,067 B2 | 6/2003 | Parks et al. |
| 5,755,148 A | 5/1998 | Stumpf et al. | 6,578,460 B2 | 6/2003 | Sartori |
| 5,771,742 A | 6/1998 | Bokaie et al. | 6,578,856 B2 | 6/2003 | Kahle |
| 5,782,001 A | 7/1998 | Gray | 6,581,655 B2 | 6/2003 | Huang |
| 5,787,779 A | 8/1998 | Garuglieri | 6,595,096 B2 | 7/2003 | Ceroll et al. |
| 5,789,885 A | 8/1998 | Seel | D47,891 S | 8/2003 | Ceroll et al. |
| 5,791,057 A | 8/1998 | Nakamura et al. | 6,601,493 B1 | 8/2003 | Crofutt |
| 5,791,223 A | 8/1998 | Lanzer | 6,607,015 B1 | 8/2003 | Chen |
| 5,791,224 A | 8/1998 | Suzuki et al. | D47,953 S | 9/2003 | Welsh et al. |
| 5,791,441 A | 8/1998 | Matos et al. | 6,617,720 B1 | 9/2003 | Egan, III et al. |

| | | |
|---|---|---|
| 6,619,348 B2 | 9/2003 | Wang |
| 6,640,683 B2 | 11/2003 | Lee |
| 6,644,157 B2 | 11/2003 | Huang |
| 6,647,847 B2 | 11/2003 | Hewitt et al. |
| 6,659,233 B2 | 12/2003 | DeVlieg |
| 6,684,750 B2 | 2/2004 | Yu |
| 6,713,980 B2 | 3/2004 | Mukai et al. |
| 6,722,242 B2 | 4/2004 | Chuang |
| 6,734,581 B1 | 5/2004 | Griffis |
| 6,736,042 B2 | 5/2004 | Behne et al. |
| 6,742,430 B2 | 6/2004 | Chen |
| 6,796,208 B1 | 9/2004 | Jorgensen |
| 6,800,819 B2 | 10/2004 | Sato et al. |
| 6,826,988 B2 | 12/2004 | Gass et al. |
| 6,826,992 B1 | 12/2004 | Huang |
| 6,840,144 B2 | 1/2005 | Huang |
| 6,854,371 B2 | 2/2005 | Yu |
| 6,857,345 B2 | 2/2005 | Gass et al. |
| 6,874,397 B2 | 4/2005 | Chang |
| 6,874,399 B2 | 4/2005 | Lee |
| 6,877,410 B2 | 4/2005 | Gass et al. |
| 6,880,440 B2 | 4/2005 | Gass et al. |
| 6,883,397 B2 | 4/2005 | Kimizuka |
| 6,886,317 B2 | 5/2005 | Jackson et al. |
| 6,889,585 B1 | 5/2005 | Harris et al. |
| 6,892,616 B2 * | 5/2005 | Yasoda et al. ............ 83/74 |
| 6,920,814 B2 | 7/2005 | Gass et al. |
| 6,922,153 B2 | 7/2005 | Pierga et al. |
| 6,945,148 B2 | 9/2005 | Gass et al. |
| 6,945,149 B2 | 9/2005 | Gass et al. |
| 6,957,601 B2 | 10/2005 | Gass et al. |
| 6,959,631 B2 * | 11/2005 | Sako ..................... 83/58 |
| 6,968,767 B2 | 11/2005 | Yu |
| 6,986,370 B1 | 1/2006 | Schoene et al. |
| 6,994,004 B2 | 2/2006 | Gass et al. |
| 6,997,090 B2 | 2/2006 | Gass et al. |
| 7,000,514 B2 | 2/2006 | Gass et al. |
| 7,210,383 B2 | 5/2007 | Gass et al |
| 2001/0048278 A1 | 12/2001 | Young et al. |
| 2002/0017175 A1 | 2/2002 | Gass et al. |
| 2002/0017176 A1 | 2/2002 | Gass et al. |
| 2002/0017178 A1 | 2/2002 | Gass et al. |
| 2002/0017179 A1 | 2/2002 | Gass et al. |
| 2002/0017180 A1 | 2/2002 | Gass et al. |
| 2002/0017181 A1 | 2/2002 | Gass et al. |
| 2002/0017182 A1 | 2/2002 | Gass et al. |
| 2002/0017183 A1 | 2/2002 | Gass et al. |
| 2002/0017184 A1 | 2/2002 | Gass et al. |
| 2002/0017336 A1 | 2/2002 | Gass et al. |
| 2002/0020261 A1 | 2/2002 | Gass et al. |
| 2002/0020262 A1 | 2/2002 | Gass et al. |
| 2002/0020263 A1 | 2/2002 | Gass et al. |
| 2002/0020265 A1 | 2/2002 | Gass et al. |
| 2002/0020271 A1 | 2/2002 | Gass et al. |
| 2002/0023306 A1 | 2/2002 | Sajedi et al. |
| 2002/0043776 A1 | 4/2002 | Chuang |
| 2002/0050201 A1 | 5/2002 | Lane et al. |
| 2002/0056348 A1 | 5/2002 | Gass et al. |
| 2002/0056349 A1 | 5/2002 | Gass et al. |
| 2002/0056350 A1 | 5/2002 | Gass et al. |
| 2002/0059853 A1 | 5/2002 | Gass et al. |
| 2002/0059854 A1 | 5/2002 | Gass et al. |
| 2002/0069734 A1 | 6/2002 | Gass et al. |
| 2002/0078796 A1 | 6/2002 | Brown |
| 2002/0096030 A1 | 7/2002 | Wang |
| 2002/0109036 A1 | 8/2002 | Denen et al. |
| 2002/0170399 A1 | 11/2002 | Gass et al. |
| 2002/0170400 A1 | 11/2002 | Gass |
| 2002/0190581 A1 | 12/2002 | Gass et al. |
| 2003/0000359 A1 | 1/2003 | Eccardt et al. |
| 2003/0002942 A1 | 1/2003 | Gass et al. |
| 2003/0005588 A1 | 1/2003 | Gass et al. |
| 2003/0015253 A1 | 1/2003 | Gass et al. |
| 2003/0019341 A1 | 1/2003 | Gass et al. |
| 2003/0020336 A1 | 1/2003 | Gass et al. |
| 2003/0037651 A1 | 2/2003 | Gass et al. |
| 2003/0037655 A1 | 2/2003 | Chin-Chin |
| 2003/0056853 A1 | 3/2003 | Gass et al. |
| 2003/0058121 A1 | 3/2003 | Gass et al. |
| 2003/0074873 A1 | 4/2003 | Freiberg et al. |
| 2003/0089212 A1 | 5/2003 | Parks et al. |
| 2003/0090224 A1 | 5/2003 | Gass et al. |
| 2003/0101857 A1 | 6/2003 | Chuang |
| 2003/0109798 A1 | 6/2003 | Kermani |
| 2003/0131703 A1 | 7/2003 | Gass et al. |
| 2003/0140749 A1 | 7/2003 | Gass et al. |
| 2004/0011177 A1 | 1/2004 | Huang |
| 2004/0040426 A1 | 3/2004 | Gass et al. |
| 2004/0060404 A1 | 4/2004 | Metzger, Jr. |
| 2004/0104085 A1 | 6/2004 | Lang et al. |
| 2004/0159198 A1 | 8/2004 | Peot et al. |
| 2004/0194594 A1 | 10/2004 | Dils et al. |
| 2004/0200329 A1 | 10/2004 | Sako |
| 2004/0226424 A1 | 11/2004 | O'Banion et al. |
| 2004/0226800 A1 | 11/2004 | Pierga et al. |
| 2004/0255745 A1 | 12/2004 | Peot et al. |
| 2005/0002301 A1 | 1/2005 | Suzuki et al. |
| 2005/0057206 A1 | 3/2005 | Uneyama |
| 2005/0066784 A1 | 3/2005 | Gass |
| 2005/0092149 A1 | 5/2005 | Hartmann |
| 2005/0139051 A1 | 6/2005 | Gass et al. |
| 2005/0139056 A1 | 6/2005 | Gass et al. |
| 2005/0139057 A1 | 6/2005 | Gass et al. |
| 2005/0139058 A1 | 6/2005 | Gass et al. |
| 2005/0139459 A1 | 6/2005 | Gass et al. |
| 2005/0145080 A1 | 7/2005 | Voigtlaender |
| 2005/0155473 A1 | 7/2005 | Gass |
| 2005/0166736 A1 | 8/2005 | Gass et al. |
| 2005/0178259 A1 | 8/2005 | Gass et al. |
| 2005/0204885 A1 | 9/2005 | Gass et al. |
| 2005/0211034 A1 | 9/2005 | Sasaki et al. |
| 2005/0235793 A1 | 10/2005 | O'Banion et al. |
| 2005/0268767 A1 | 12/2005 | Pierga et al. |
| 2005/0274432 A1 | 12/2005 | Gass et al. |
| 2006/0000337 A1 | 1/2006 | Gass |
| 2006/0032352 A1 | 2/2006 | Gass et al. |
| 2006/0096425 A1 | 5/2006 | Keller |
| 2006/0272463 A1 | 12/2006 | Gass |

FOREIGN PATENT DOCUMENTS

| | | |
|---|---|---|
| DE | 76186 | 8/1921 |
| DE | 2800403 | 7/1979 |
| DE | 3427733 | 1/1986 |
| DE | 4235161 | 5/1993 |
| DE | 4326313 | 2/1995 |
| DE | 19609771 | 6/1998 |
| EP | 146460 | 11/1988 |
| ES | 2152184 | 1/2001 |
| FR | 2556643 | 6/1985 |
| FR | 2570017 | 3/1986 |
| GB | 598204 | 2/1948 |
| GB | 1132708 | 11/1968 |
| GB | 2096844 | 10/1982 |
| GB | 2142571 | 1/1985 |

OTHER PUBLICATIONS

Shop Fox® Fence Operating Manual, Woodstock International, Inc., 1996, revised May 1997.

Gordon Engineering Corp., Product Catalog, pp. cover, 1, 3 and back, Brookfield, Connecticut, US, Oct. 1997.

Analog Devices, Inc., 3-Axis Capacitive Sensor—Preliminary Technical Data AD7103, pp. 1-40, © 1998.

*Microelectronic Circuits*, Sedra et al., pp. 995-997, 1998.

U.S. Appl. No. 60/157,340, filed Oct. 1, 1999, entitled "Fast-Acting Safety Stop."

U.S. Appl. No. 60/182,866, filed Feb. 16, 2000, entitled "Fast-Acting Safety Stop."

IWF 2000 Challengers Award Official Entry Form, submitted Apr. 26, 2000, 6 pages plus CD (the portions of U.S. patent applications referenced in the form are from U.S. Appl. No. 60/157,340, filed Oct. 1, 1999 and U.S. Appl. No. 60/182,866, filed Feb. 16, 2000).

Excaliber T-Slot Precision Saw Fence Model TT45 Owner's Manual, Sommerville Design & Manufacturing, Inc., May 2000.

Bosch Model 4000 Worksite Table Saw Operating/Safety Instructions, S-B Power Tool . Company, Jul. 2000.

XACTA Fence II™ Homeshop 30/52 Owner's Manual, JET Equipment & Tools, Mar. 2001.
XACTA Fence II™ Commercial 30/50 Owner's Manual, JET Equipment & Tools, Mar. 2001.
Bosch 10" Table Saw Model 0601476139 Parts List and Technical Bulletin, S-B Power Tool Company, Apr. 2001.
Biesemeyer® T-Square® Universal Home Shop Fence system Instruction Manual, Delta Machinery, Jun. 1, 2001.
Powermatic 10" Tilting Arbor Saw Model 66 Instruction Manual & Parts List, JET Equipment & Tools, Jun. 2001.
Skil Model 3400 Table Saw Operating/Safety Instructions, S-B Power Tool Co., Sep. 2001.
The Merlin Splitter by Excalibur a Sommerville Design Product Overview & Generic Installation Notes, Sommerville Design & Manufacturing Inc., at least as early as 2002.
INCRA Incremental Micro Precision Table Saw Fence Owner's Manual, Taylor Design Group, Inc., 2003.
Shop Fox® Models W2005, W2006, W2007 Classic Fence Instruction Manual, Woodstock International, Jan. 2000, revised Mar. 2004.
ACCU-FENCE® 64A Fence and Rail System Owner's Manual, WMH Tool Group, Sep. 2004.
Unifence™ Saw Guide Instruction Manual, Delta Machinery, Feb. 22, 2005.
Biesemeyer® T-Square® Commercial Fence System Instruction Manual, Delta Machinery, May 2, 2005.
Young Inventor: Teen's Device Earns Her Trip to Science Fair, *The Arizona Republic*, May 5, 2006.
Operator Injury Mitigation Using Electronic Sensing and Mechanical Braking and Decoupling Devices in Handheld Circular Saws, Erin F. Eppard, date unknown.
Laguna Tools table saw owner's manual, date unknown.
*You Should Have Invented It*, French television show DVD, date unknown.

* cited by examiner

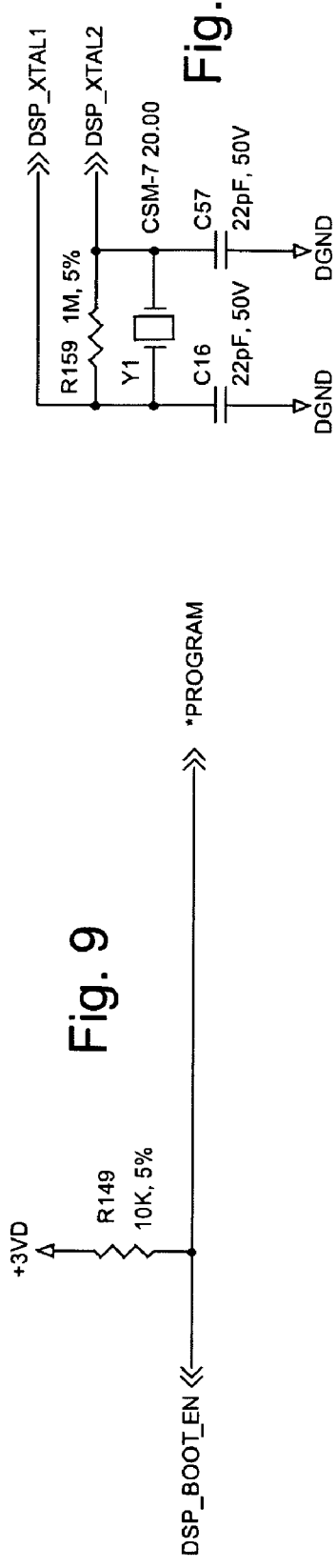
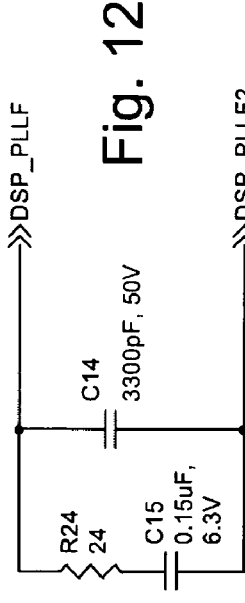
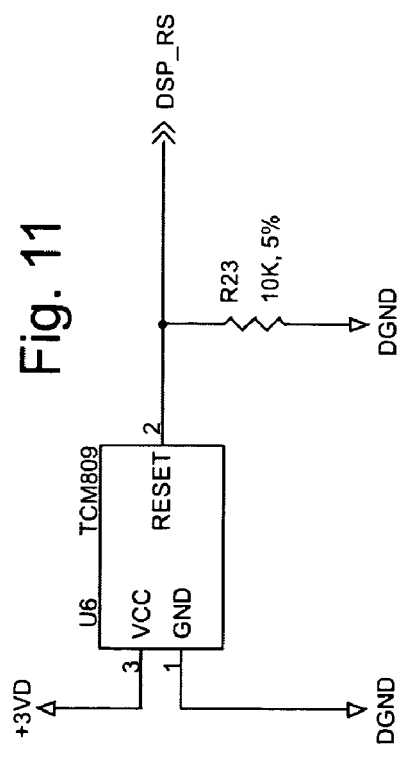
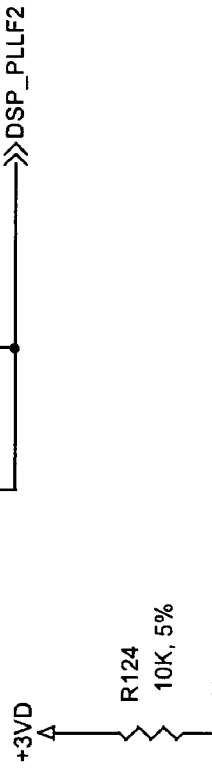
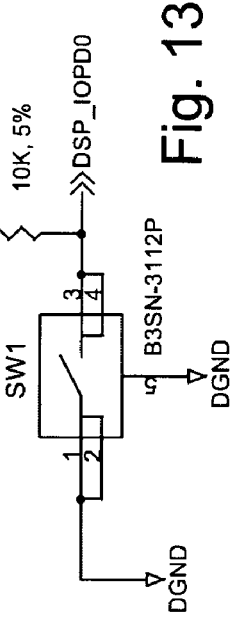

DETECTION SYSTEMS FOR POWER EQUIPMENT

CROSS-REFERENCE TO RELATED APPLICATIONS

This application is a continuation of U.S. patent application Ser. No. 12/322,069, filed Jan. 26, 2009, issuing as U.S. Pat. No. 7,707,918 on May 4, 2010, which is a continuation of U.S. patent application Ser. No. 11/107,499, filed Apr. 15, 2005, issuing as U.S. Pat. No. 7,481,140 on Jan. 27, 2009. This application is also a continuation of U.S. patent application Ser. No. 12/454,569, filed May 18, 2009 now U.S. Pat. No. 7,991,503, which is a continuation of U.S. patent application Ser. No. 11/027,600, filed Dec. 31, 2004, issuing as U.S. Pat. No. 7,536,238 on May 19, 2009, which claims the benefit of and priority from U.S. Provisional Patent Application Ser. No. 60/533,791, filed Dec. 31, 2003. These applications and their disclosures are herein incorporated by reference.

COMPUTER PROGRAM LISTING APPENDIX

Two compact discs, each containing a computer program listing that is one implementation of the methods and systems described herein, are being submitted herewith as a Computer Program Listing Appendix. The compact discs are identified as "Copy 1" and "Copy 2" and they are identical. The program listing is stored on each compact disc as one ASCII text file entitled "program.asm". The date of creation of the files is Apr. 15, 2005, and the size of each file is 474 kbytes. The material on the compact discs is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The present invention relates to safety systems for power tools such as table saws, miter saws, band saws, hand-held circular saws, jointers, shapers, routers, up-cut saws, and other machinery. More particularly, the present invention relates to detecting contact between a human and a portion of a piece of power equipment.

BACKGROUND

Safety systems may be employed with power equipment to minimize the risk of injury when using the equipment. Some safety systems include an electronic system to detect the occurrence of a dangerous condition and a reaction system to minimize any possible injury from the dangerous condition. For instance, some safety systems attempt to detect when a human body contacts or comes into dangerous proximity to a predetermined portion of a machine, such as detecting when a user's hand touches the moving blade of a saw. When that dangerous condition is detected, the safety system reacts to minimize injury.

BRIEF DESCRIPTION OF THE DRAWINGS

FIG. 9 is a diagram of a circuit that can be used to program the digital signal processing microcontroller shown in FIG. 8 from an external source.

FIG. 10 is a diagram of a circuit that provides a cycle time for the digital signal processing microcontroller shown in FIG. 8.

FIG. 11 is a diagram of a circuit used to hold the digital signal processing microcontroller shown in FIG. 8 in reset unless a power supply is at proper operating voltage.

FIG. 12 is a diagram of a phase lock loop used with the digital signal processing microcontroller shown in FIG. 8.

FIG. 13 is a diagram of a switch that can be used with the digital signal processing microcontroller shown in FIG. 8.

DETAILED DESCRIPTION

Figure 1:
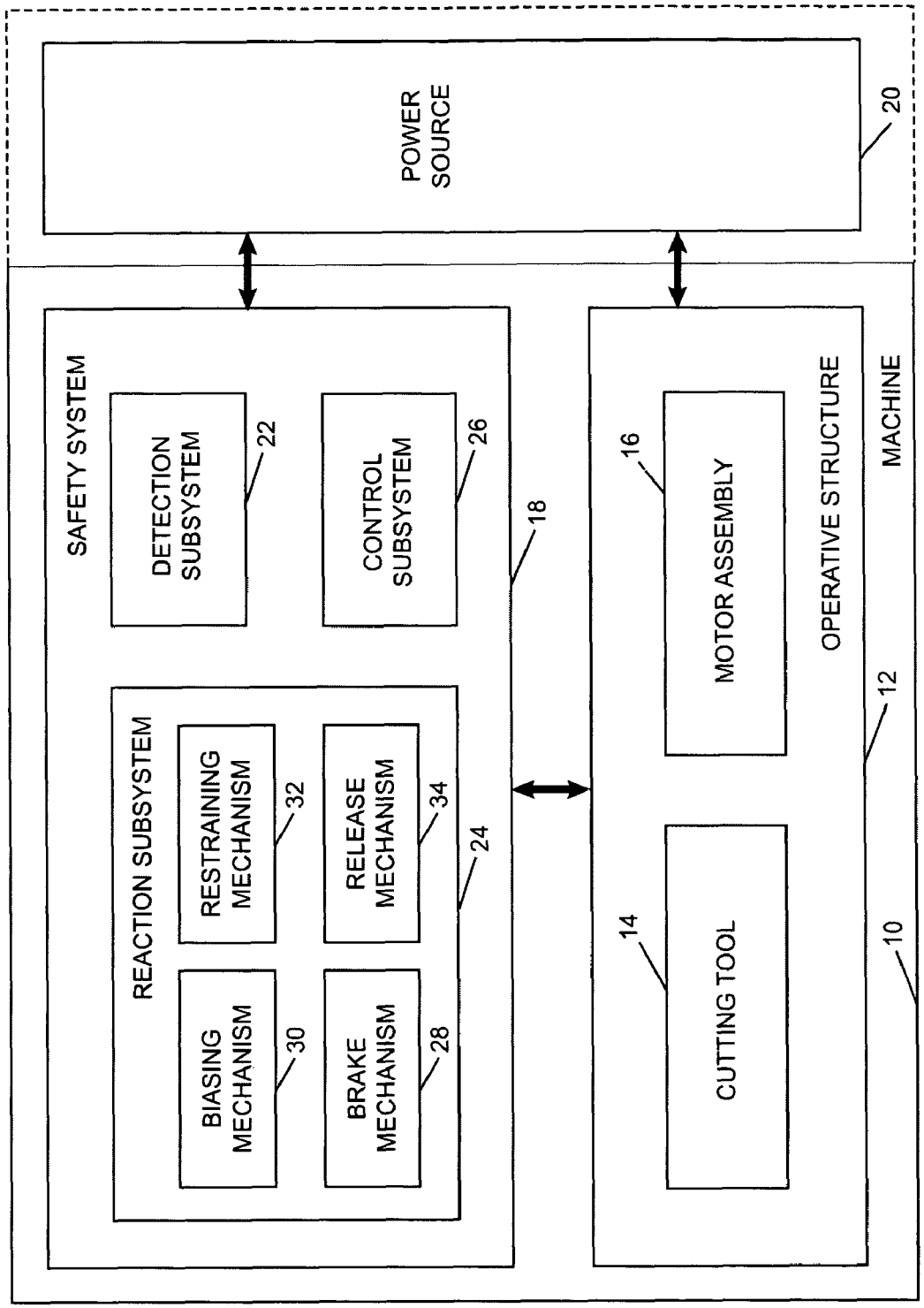
FIG. 1 is a schematic block diagram of a machine with a fast-acting safety system.

A machine that incorporates a safety system to detect and react to human contact with the machine is shown schematically in FIG. 1 and indicated generally at 10. Machine 10 may be any of a variety of different machines, such as table saws, miter saws, band saws, jointers, shapers, routers, hand-held circular saws, up-cut saws, sanders, etc. Machine 10 includes an operative structure 12 having a working or cutting tool 14 and a motor assembly 16 adapted to drive the cutting tool. Machine 10 also includes a safety system 18 configured to minimize the potential of a serious injury to a person using the machine. Safety system 18 is adapted to detect the occurrence of one or more dangerous conditions during use of the machine. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18.

Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms. For example, operative structure 12 may include a stationary housing configured to support motor assembly 16 in driving engagement with cutting tool 14. Alternatively, operative structure 12 may include one or more transport mechanisms adapted to convey a work piece toward and/or away from cutting tool 14.

Motor assembly 16 includes at least one motor adapted to drive cutting tool 14. The motor may be either directly or indirectly coupled to the cutting tool, and may also be adapted to drive work piece transport mechanisms. The particular form of cutting tool 14 will vary depending upon the various embodiments of machine 10. For example, cutting tool 14 may be a single, circular rotating blade having a plurality of teeth disposed along the perimetrical edge of the blade. Alternatively, the cutting tool may be a plurality of circular blades, such as a dado blade or dado stack, or some other type of blade or working tool.

Safety system 18 includes a detection subsystem 22, a reaction or danger mitigation subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous or triggering conditions during use of machine 10. For example, the detection subsystem may be configured to detect that a portion of the user's body is dangerously close to or in contact with a portion of cutting tool 14. As another example, the detection subsystem may be configured to detect the rapid movement of a workpiece due to kickback by the cutting tool, as is described in U.S. patent application Ser. No. 09/676,190, the disclosure of which is herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Patent Application Publication No. 2002/0017183 A1, entitled "Cutting Tool Safety System," the disclosure of which is herein incorporated by reference. Retracting the cutting tool is described in more detail in U.S. Patent Application Publication No. 2002/0017181 A1, entitled "Retraction System for Use in Power Equipment," and U.S. Patent Application Ser. No. 60/452,159, filed Mar. 5, 2003, entitled "Retraction System and Motor Position for Use With Safety Systems for Power Equipment," the disclosures of which are herein incorporated by reference.

The configuration of reaction subsystem 24 typically will vary depending on which action or actions are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
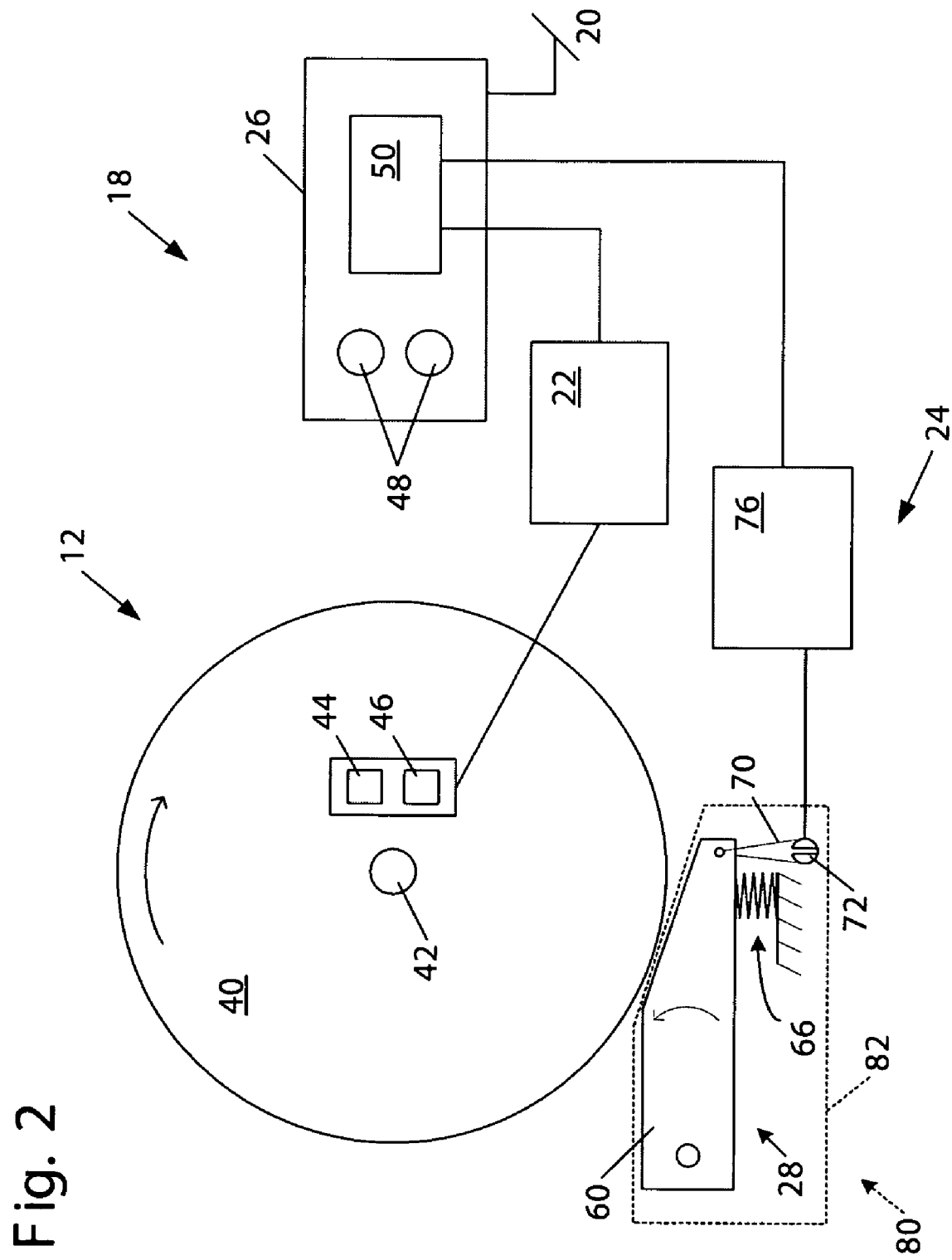
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade. U.S. Patent Application Publication No. 2002/0017175 A1, entitled "Translation Stop For Use In Power Equipment," the disclosure of which is herein incorporated by reference, describes other systems for stopping the movement of the cutting tool. U.S. Patent Application Publication No. 2002/0017184 A1, entitled "Table Saw With Improved Safety System," U.S. Patent Application Publication No. 2002/0017179 A1, entitled "Miter Saw With Improved Safety System," U.S. Patent Application Publication No. 2002/0059855 A1, entitled "Miter Saw with Improved Safety System," U.S. Patent Application Publication No. 2002/0056350 A1, entitled "Table Saw With Improved Safety System," U.S. Patent Application Publication No. 2002/0059854 A1, entitled "Miter Saw With Improved Safety System," U.S. Patent Application Publication No. 2002/0056349 A1, entitled "Miter Saw With Improved Safety System," U.S. Patent Application Publication No. 2002/0056348 A1, entitled "Miter Saw With Improved Safety System," and U.S. Patent Application Publication No. 2002/0066346 A1, entitled "Miter Saw With Improved Safety System," U.S. Patent Application Publication No. 2003/0015253 A1, entitled "Router With Improved Safety System," U.S. Patent Application Publication No. 2002/0170400 A1, entitled "Band Saw With Improved Safety System," U.S. Patent Application Publication No. 2003/0019341 A1, entitled "Safety Systems for Band Saws," U.S. Patent Application Publication No. 2003/0056853 A1, entitled "Router With Improved Safety System," U.S. Provisional Patent Application Ser. No. 60/406,138, entitled "Miter Saw With Improved Safety System," U.S. Provisional Patent Application Ser. No. 60/496,550, entitled "Table Saws With Safety Systems," and U.S. Provisional Patent Application Ser. No. 60/533,811, entitled "Improved Table Saws with Safety Systems," the disclosures of which are all herein incorporated by reference, describe safety system 18 in the context of particular types of machines.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of machine 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Patent Application Publication No. 2002/0017176 A1, entitled "Detection System For Power Equipment," U.S. Patent Application Publication No. 2002/0017336 A1, entitled "Apparatus And Method For Detecting Dangerous Conditions In Power Equipment," U.S. Patent Application Publication No. 2002/0069734 A1, entitled "Contact Detection System for Power Equipment," U.S. Patent Application Publication No. 2002/0190581 A1, entitled "Apparatus and Method for Detecting Dangerous Conditions in Power Equipment," U.S. Patent Application Publication No. 2003/0002942 A1, entitled "Discrete Proximity Detection System," and U.S. Patent Application Publication No. 2003/0090224 A1, entitled "Detection System for Power Equipment," the disclosures of which are herein incorporated by reference.

Control subsystem 26 includes one or more instruments 48 that are operable by a user to control the motion of blade 40. Instruments 48 may include start/stop switches, speed controls, direction controls, light-emitting diodes, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, work piece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26, and components that may be used in control system 26, are described in more detail in U.S. Patent Application Publication No. 2002/0020262 A1, entitled "Logic Control For Fast Acting Safety System," U.S. Patent Application Publication No. 2002/0017178 A1, entitled "Motion Detecting System For Use In Safety System For Power Equipment," U.S. Patent Application Publication No. 2003/0058121 A1, entitled "Logic Control With Test Mode for Fast-Acting Safety System," U.S. Provisional Patent Application Ser. No. 60/496,568, entitled "Motion Detecting System for use in a Safety System for Power Equipment," and U.S. Provisional Patent Application Ser. No. 60/533,598, entitled "Switch Box for Power Tools with Safety Systems," the disclosures of which are herein incorporated by reference.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as fully annealed aluminum, etc. It will be appreciated that the construction of pawl 60 may vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. It should be understood that sliding or rotary movement of pawl 60 might also be used. The spring is adapted to urge pawl 60 into the teeth of the blade with sufficient force to grip the blade and quickly bring it to a stop.

The pawl is held away from the edge of the blade by a restraining mechanism in the form of a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the blade to reduce the distance the pawl must travel to engage the blade. Positioning the pawl relatively close to the edge of the blade reduces the time required for the pawl to engage and stop the blade. Typically, the pawl is held approximately $\frac{1}{32}$-inch to $\frac{1}{4}$-inch from the edge of the blade by fusible member 70; however other pawl-to-blade spacings may also be used.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Patent Application Publication No. 2002/0020263 A1, entitled "Firing Subsystem For Use In A Fast-Acting Safety System," U.S. Patent Application Publication No. 2002/0020271 A1, entitled "Spring-Biased Brake Mechanism for Power Equipment," U.S. Patent Application Publication No. 2002/0017180 A1, entitled "Brake Mechanism For Power Equipment," U.S. Patent Application Publication No. 2002/0059853 A1, entitled "Power Saw With Improved Safety System," U.S. Patent Application Publication No. 2002/0020265 A1, entitled "Translation Stop For Use In Power Equipment," U.S. Patent Application Publication No. 2003/0005588 A1, entitled "Actuators For Use in Fast-Acting Safety Systems," and U.S. Patent Application Publication No. 2003/0020336 A1, entitled "Actuators For Use In Fast-Acting Safety Systems," the disclosures of which are all herein incorporated by reference.

It will be appreciated that activation of the brake mechanism will require the replacement of one or more portions of safety system 18. For example, pawl 60 and fusible member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge, and various brake pawls, are described in more detail in U.S. Patent Application Publication No. 2002/0020261 A1, entitled "Replaceable Brake Mechanism For Power Equipment," U.S. Patent Application Publication No. 2002/0017182 A1, entitled "Brake Positioning System," U.S. Patent Application Publication No. 2003/0140749 A1, entitled "Brake Pawls for Power Equipment," U.S. Provisional Patent Application Ser. No. 60/496,574, entitled "Brake Cartridges for Power Equipment," filed Aug. 20, 2003, and U.S. Provisional Patent Application Ser. No. 60/533,575, entitled "Brake Cartridges and Mounting Systems for Brake Cartridges," the disclosures of which are all herein incorporated by reference.

While one particular implementation of safety system 18 has been described, it will be appreciated that many variations and modifications are possible. Many such variations and modifications are described in U.S. Patent Application Publication No. 2002/0170399 A1, entitled "Safety Systems for Power Equipment," U.S. Patent Application Publication No. 2003/0037651, entitled "Safety Systems for Power Equipment," and U.S. Patent Application Publication No. 2003/0131703 A1, entitled "Apparatus and Method for Detecting Dangerous Conditions in Power Equipment," the disclosures of which are herein incorporated by reference.

In some applications, detection subsystem 22 detects contact between a human and a predetermined portion of the machine and it is desirable to distinguish that contact from contact with other materials. For example, in a saw the detection subsystem may detect contact between a person and the blade and distinguish that contact from contact between the blade and other materials such as wet or green wood. It should also be understood that in many aspects of the inventions disclosed herein the dangerous condition detected could be dangerous proximity rather than actual contact, even though much of the disclosure is particularly to detecting actual contact.

Figure 3:
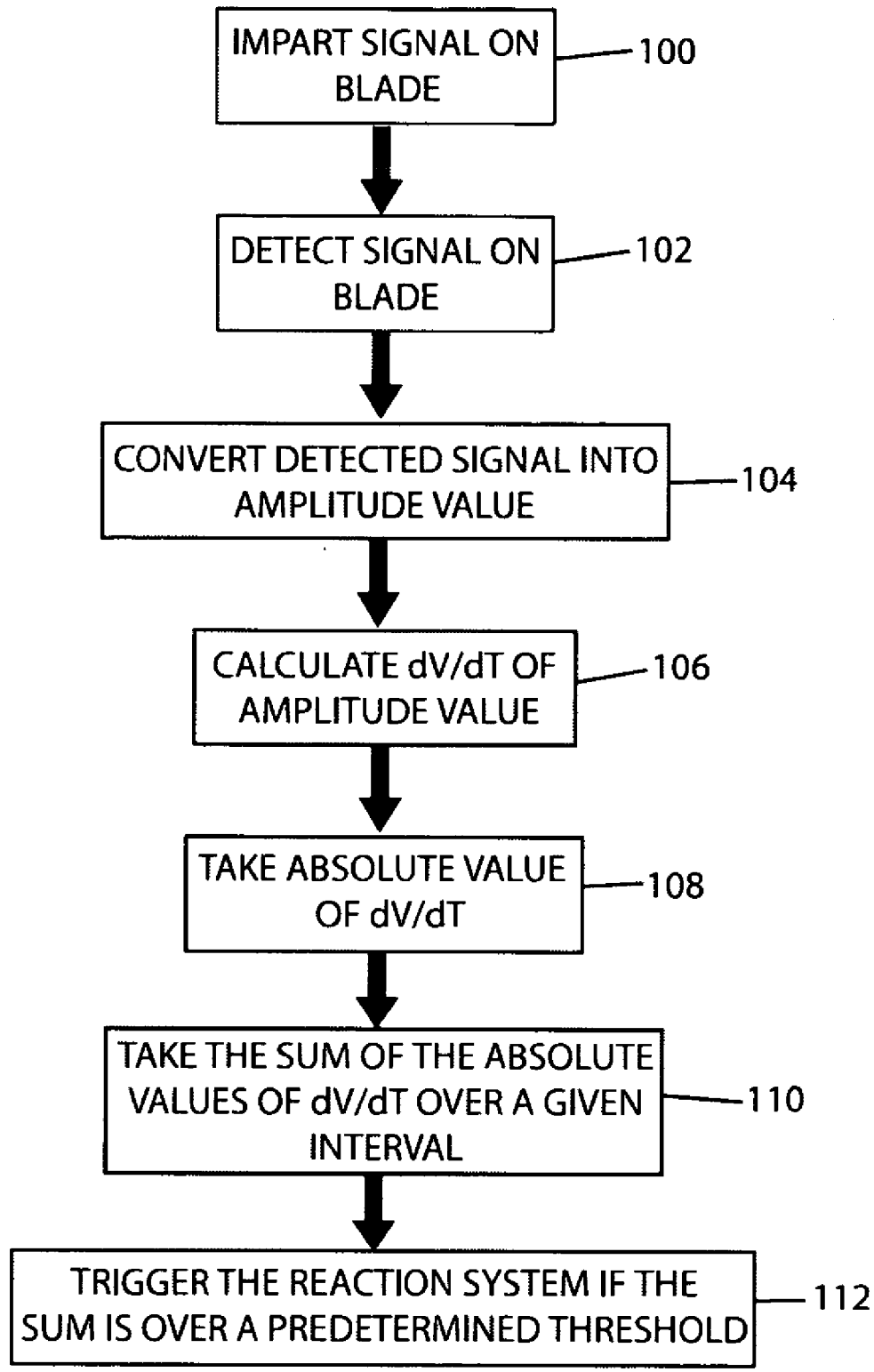
FIG. 3 is a flowchart of a method of detecting contact.

One method of distinguishing human contact from contact with other materials is shown generally in FIG. 3. First, as explained above, the electrical impedance of the blade is monitored, such as by inducing an electrical signal on the blade, which is represented by box 100 in FIG. 3. The electrical impedance of the blade can be monitored in a variety of ways, such as applying a fixed voltage to a drive electrode coupled to the blade and monitoring the voltage thereby induced on the blade. That voltage will drop as the apparent impedance of the blade drops. Alternatively, the amount of electrical current delivered to the blade for a fixed drive voltage can be monitored and this current would go up as the impedance of the blade dropped. However the impedance of the blade is measured or monitored, the detection system looks for changes at 102. Such changes in electrical impedance will occur when the blade cuts into or contacts a person. However, the electrical impedance may also change due to other circumstances, such as when the blade contacts other materials, especially wet or green wood, or when the signal is exposed to electrical noise. It is desirable to distinguish the change in the electrical impedance caused by human contact from changes in the impedance caused by other events; otherwise, the detection system may falsely detect contact with a human when it should not.

As one exemplary way to distinguish changes in the electrical impedance, the method converts the detected signal on the blade into values proportional to the peak-to-peak amplitude or RMS amplitude of the signal, as shown at 104. In one implementation, the method discretely converts the detected signal into amplitude values every 6 microseconds. Of course, other time periods could be used, such as every 2 to 10 microseconds or the conversion could even be done continuously. One way of converting the detected signal is to integrate the absolute value of the detected signal about its average value, resulting in a data point that is proportional to the peak-to-peak amplitude of the detected signal.

Integrating the signal has the benefit of averaging out the effect of noise on the signal, resulting in a data point that is relatively resistant to noise. For instance, it can be seen that if the signal used for contact detection has a frequency of 500 kHz, then three cycles of the signal will be integrated to generate the amplitude level. However, if there is a 10 MHz noise present, that noise will have relatively little effect on the measured amplitude value since it will be substantially averaged out over the course of the integration. Similarly, if there is a low frequency noise on the signal that shifts the apparent DC level of the 500 khz somewhat, the absolute value integration will minimize the effect since one lobe of the sine wave will be increased by the DC shift and the following lobe will be lowered, with the overall effect of the DC offset on the measurement of amplitude being substantially reduced, although not entirely eliminated. In other words, integrating the signal can be seen as a noise reduction technique. It will of course be understood that numerous other techniques could be used to generate a value proportional to the amplitude of the signal, such as looking for the difference between the maximum and minimum values over some interval or even just looking for the peak value over some time interval.

It should be noted that although the system for detecting contact is described herein principally in terms of monitoring the amplitude of a signal on the blade, more generally, the system is monitoring the electrical impedance of the blade and the amplitude of the signal is just one measure of that impedance. The system could equally well be implemented with values proportional to other characteristics of the impedance, such as the phase of the signal on the blade, current delivered to the blade or any other variable related to the electrical impedance of the blade. In reading the description herein, it should be understood that the values tracked could be based on any variable related to the electrical impedance of the blade.

At the time of integration, the signal on the blade may have increased or decreased from an immediately prior integration, causing the value of the current data point to be larger or smaller than the value of the prior data point. The method compares the value of the current integrated data point to the last previously integrated data point to see how the signal has changed, as shown at 106. This change is sometimes referred to as dV/dt or the change in value of the data point over time. This dV/dt value is typically referred to as a derivative or rate of change and is proportional to the rate of change of the amplitude of the signal on the blade. Again, this dV/dt value could be calculated or sampled at varying intervals from continuous to every 10 microseconds or longer depending on how fast relevant changes in the signal properties may occur.

In order to generate a value proportional to the cumulative or persistent rate of change of the signal over some time interval, the method takes the absolute value of dV/dt at 108, and then sequentially adds together a given number of such absolute values at 110. For example, the method may sum the prior 16 data points, which means that if the method obtains a new data point every 6 microseconds, then the method will look at a window of 96 microseconds. If the sum of the dV/dt values during that window is greater than a predetermined threshold value, then the detection system concludes that the blade has contacted a person and the detection system will trigger the reaction system. The predetermined threshold value is set empirically based on experimentation and observed test results and is dependent on the electrical impedance of the blade and the various materials to be distinguished, as well as the characteristics of the way the signal is induced on and detected from the blade. The sum of the absolute values of dV/dt of these 16 data points may be referred to as a short sum. It should be understood that it is not necessary to take the absolute value of the signal, but rather just the sum of the dV/dt values could be computed, although it is believed that summing the absolute value of the dV/dt values provides better discrimination of human contact events from other effects that can change the signal on the blade. Whether the absolute value or unmodified values are summed, this scheme can be seen as looking at the accumulated time properties of a data stream related to the electrical impedance of the blade, in distinction to just looking at an instantaneous value, such as the instantaneous rate of change.

The method preferably repeats continuously while the machine is functioning. Typically the method will repeat for each new data point. Thus, if a new data point is integrated every 6 microseconds then the method would repeat every 6 microseconds. As the method repeats, the newest absolute value of dV/dt replaces the oldest such value in the sum so that the window of time the short sum covers is continuously moving or sliding forward. In terms of processing, this can be accomplished by storing the short sum in memory and adding to that sum each new data point while subtracting from that sum the oldest data point. Alternatively, if the integration is done continuously, such as by an analog integrator with a decay time constant, the dV/dt sum could likewise be generated by feeding an electrical signal proportional to the dV/dt into another analog integrator with a fixed decay time constant to generate a signal proportional to the running sum of dV/dt values.

This method is particularly applicable for machines using blades with relatively coarse teeth and significant gullets between the teeth, such as a 28-tooth circular blade with a diameter of 10 inches, where typically one tooth at a time would contact a person in an accident. This method has been found to distinguish contact between a person and such a blade from contact between wet or green wood and the blade because when the tooth of the spinning blade contacts a person and begins to cut into the skin, the signal on the blade will drop quickly due to the sudden connection of the human body's inherent capacitance via the conductive contact between the tooth and the person. Similarly, the signal will rise sharply when the tooth breaks contact with the person. The length of the short sum is typically adjusted to cover the typical time interval that a tooth would be in contact with a finger so that it sums both the dV/dts generated by the drop in signal when the tooth comes into contact with the finger and the dV/dts generated by the rise in signal when the tooth leaves the finger. It has been observed with a particular signal coupling to and from the blade that the signal on the blade typically drops in the range of 15-30%. When the tooth moves out of contact with the body, the signal will go up a corresponding amount. The method will detect and monitor how the signal amplitude changes, and add the changes together to arrive at the short sum, as described. In contrast, when the tooth of a blade cuts into wet or green wood, for example, or when the tooth moves out of contact with wet or green wood, it has been observed that the change in the signal is not as sudden even though the total amplitude change of the signal over time may be similar to the amplitude changes seen when contacting a person. Thus, the sum of dV/dt values resulting from contact with a person is typically greater than the sum of such values resulting from contact with wet or green wood over the period observed by the short sum.

As explained above, one implementation of the short sum method sums the 16 most recent dV/dt values, resulting in a 96 microsecond window. That window corresponds roughly to the time it takes one tooth on a 10 inch blade spinning at 4000 rpm to move into and out of contact with a finger in what is believed to be a typical accident scenario. It has been observed from experiments conducted with a hot dog acting as a finger that the sum of dV/dt values for hot dog contact is significantly greater than the sum of dV/dt values for wet or green wood contact. The threshold at which the sum of the dV/dt values will trigger the reaction system will be set empirically to optimize the performance of the method in any given machine. As a starting point, the threshold may be set at 30% of the baseline integrated data value, or in other words, the normal value if nothing is touching the blade.

Using a window of roughly 96 to 100 microseconds to look at the short sum allows the method to focus on changes in the signal rather than on the amplitude of the signal itself. This is useful when cutting wet or green wood, especially wet plywood, wet particle board, or other glued wood products. Those types of materials can create a dielectric effect by being adjacent the blade and the dielectric effect may cause the amplitude of the signal to change in proportion to the amount of material around the blade. Thus, looking simply at the amplitude of the signal may in some cases result in the detection system determining that the blade has contacted a person when in reality it has contacted wet or green wood. The rate of change of the signal, however, is typically more gradual when cutting wet or green wood than it is when the blade contacts a person, especially when accumulated over a period of time rather than looked at instantaneously, so the dV/dt values are different and the cumulative sum of the absolute values of dV/dt values over an appropriately selected interval allows the detection system to differentiate those contacts.

The method disclosed in FIG. 3 may also be adapted for blades with relatively fine teeth, where typically more than one tooth at a time would contact a person in an accident, such as with a 200-tooth plywood blade. With such a blade, it has been observed that the overall amplitude of the signal will drop both when cutting into a person and when cutting into wet or green wood, especially wet, glued wood. However, the overall drop in amplitude will be accompanied by many sudden and frequent changes when cutting into a person because of the number and nature of teeth contacting the person's body. When cutting into wet or green wood the overall drop in amplitude is accomplished by a relatively smoother decline. Thus, the accumulated dV/dt values over time when cutting into a person with a fine tooth blade will be greater than when cutting into wet or green wood. With this in mind, the method disclosed in FIG. 3 may be adapted so that the sum of the absolute values of dV/dt is taken over a longer interval, and this sum may be referred to as the long sum. The window or number of data points summed by the long sum may be chosen to correspond to the approximate time for one tooth and one gullet on a coarse-toothed blade (e.g. a 28-tooth blade) to move past a given point. Such a window would be approximately 300-750 microseconds, or around 50-125 data points and more preferably around 70-90 data points sampled at 6 microsecond intervals. The window is preferably chosen so that at least one complete period of tooth strikes would be included in the window, even on a coarse toothed blade. This effectively averages the rate of change of the signal over the time period of a single tooth when cutting with a coarse tooth blade. This long sum is most responsive to the presence of many smaller fluctuations in the signal, such as occur when many small teeth are contacting a finger versus a single large dip in the signal seen with coarser blades.

Typically the detection system will include both the short and long sums operating in parallel, and the system will trigger the reaction system if either sum exceeds its predetermined threshold. In other words, the detection system will sum the absolute values of dV/dt for the first 16 data points and determine whether that short sum is greater than a first threshold. The method will also sum the absolute values of dV/dt for roughly the last 80 data points, and determine whether that long sum is greater than a second threshold. If either threshold is met or exceeded, then the method will trigger the reaction system. If not, the method repeats for each new data point.

Thinking of the method in terms of processing in a DSP or microcontroller implementation, the processor will store running totals for the short and long sums. Each time a new data point is calculated, the method will add that data point to each of the running sums and subtract the oldest data point. If either sum ever meets or exceeds its respective threshold, then the method will trigger the reaction system. It should be understood that the method does not need to trigger the reaction system in response to a single sum being over the threshold. It may also be desirable to require some number of sequential sums to be over a threshold value or for some proportion of recent sum values to be over a threshold value. In addition, it is possible to have the triggering of the reaction system be based on how much the sums exceed the threshold value. For instance, exceeding the threshold value by 50% may cause an immediate trigger, whereas the system may require three consecutive values over the threshold if the values exceed the threshold by only 1%.

Figure 4:
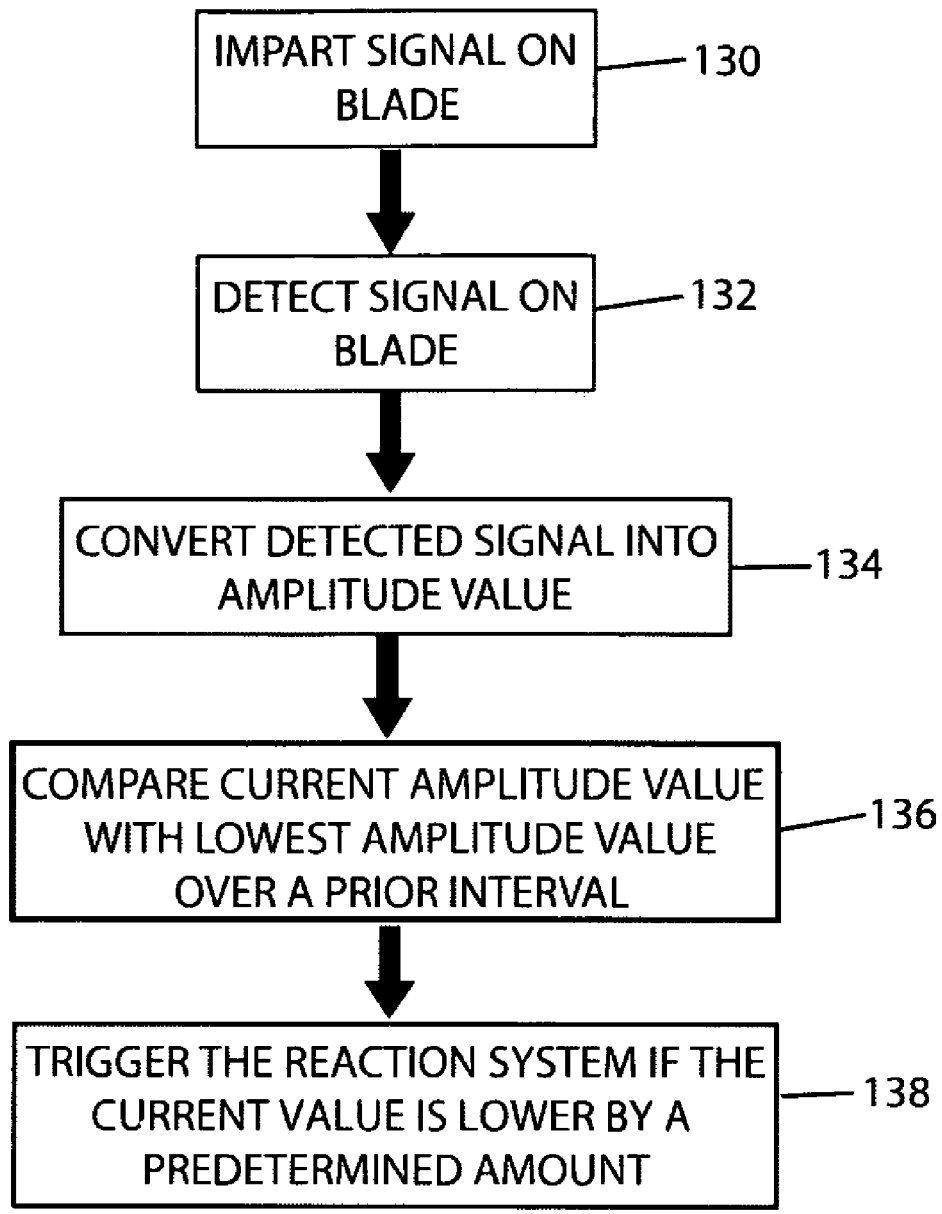
FIG. 4 is a flowchart of another method of detecting contact.

Detection subsystem 22 may also implement a third method of detecting contact between a blade and a person. This third method is represented generally in FIG. 4 and may be referred to as a method for detecting a relatively slow drop in the electrical impedance of the blade. First, a signal is imparted to a designated portion of a machine, such as to the blade of a table saw, as shown at 130. The method then detects the signal at 132 and converts the signal into an integer proportional to the amplitude value at 134. The method then checks to see if the amplitude value is lower by a predetermined amount than any amplitude value during a designated prior interval of time, as shown at 136. If it is, then the method triggers the reaction system, as shown at 138. As discussed previously, it is not necessary to look at the amplitude of the signal on the blade and any other electrical signal property related to the electrical impedance of the blade could equally be used.

In one embodiment, every 6 microseconds (or some other predetermined time interval) the method detects the signal on the blade and converts the signal into an amplitude value. Every 768 microseconds the method will collect 128 amplitude values (one value every 6 microseconds) and store the lowest value in a bin. A predetermined number of bins will be used to store the low values over successive periods of time. For example, the method may employ ten bins numbered 1 through 10, with bin 1 storing the lowest amplitude value over the 728 microsecond interval from time $t_0$ to $t_1$, bin 2 storing the lowest amplitude value from the next time interval $t_1$ to $t_2$, bin 3 storing the lowest amplitude value from time $t_2$ to $t_3$, and so forth with bin 10 storing the most recent lowest amplitude value from time $t_9$ to $t_{10}$. The method will then compare the current amplitude value with the values in a prior interval, such as in bins 1 through 5. If the current amplitude value is lower than the lowest amplitude value in bins 1 through 5 by a predetermined amount, such as 15-30%, then the method will trigger the reaction system.

The method compares the current value with a prior, non-adjacent interval of time in order to be able to detect when a person comes into contact with the blade relatively slowly. If a person moves into contact with the blade slowly, the signal will drop but the drop could be relatively gradual. In that case, the lowest amplitude value in relation to the most recent bin may not be sufficiently different to trigger the reaction system. By comparing the current amplitude signal with a prior, non-adjacent time interval, the method is better able to detect more gradual drops in the signal. Thus, the method may compare the current amplitude signal with those in bins 1 through 5 rather than those in bins 6 through 10. Each new amplitude value is compared with the signals from a prior interval, and the amplitude values for the prior interval are updated as new amplitudes are calculated. For example, using the intervals and bins discussed above, every 728 microseconds the value in bin 1 is discarded, the values in bins 2 through 10 are shifted to bins 1 through 9, and a new value is added to bin 10. If the current amplitude value is lower than the lowest amplitude value against which it is compared by a predetermined threshold or amount, then the method will trigger the reaction system, as explained. The threshold amount and the desired time interval are empirically determined through experimentation and observation. It is believed that one appropriate threshold is roughly 15% to 30% lower than the low values expected during typical operation of the machine. It is believed that one suitable interval is roughly 5 milliseconds, ending approximately 5 milliseconds before the time the current amplitude value is determined for a saw blade spinning at 4000 rpm.

Some detection subsystems may include a gain control to maintain the signal on the blade at a desired amplitude. If the signal on the blade drops for whatever reason, including if the signal drops because a person contacted the blade, then the gain control tries to raise the signal to maintain a target level of the signal on the blade. If the signal on the blade is higher than the desired amplitude, then the gain control tries to lower the signal. Watching the gain control for instances when it tries to raise the signal on the blade can serve as the basis for a fourth method of detecting contact.

Figure 5:
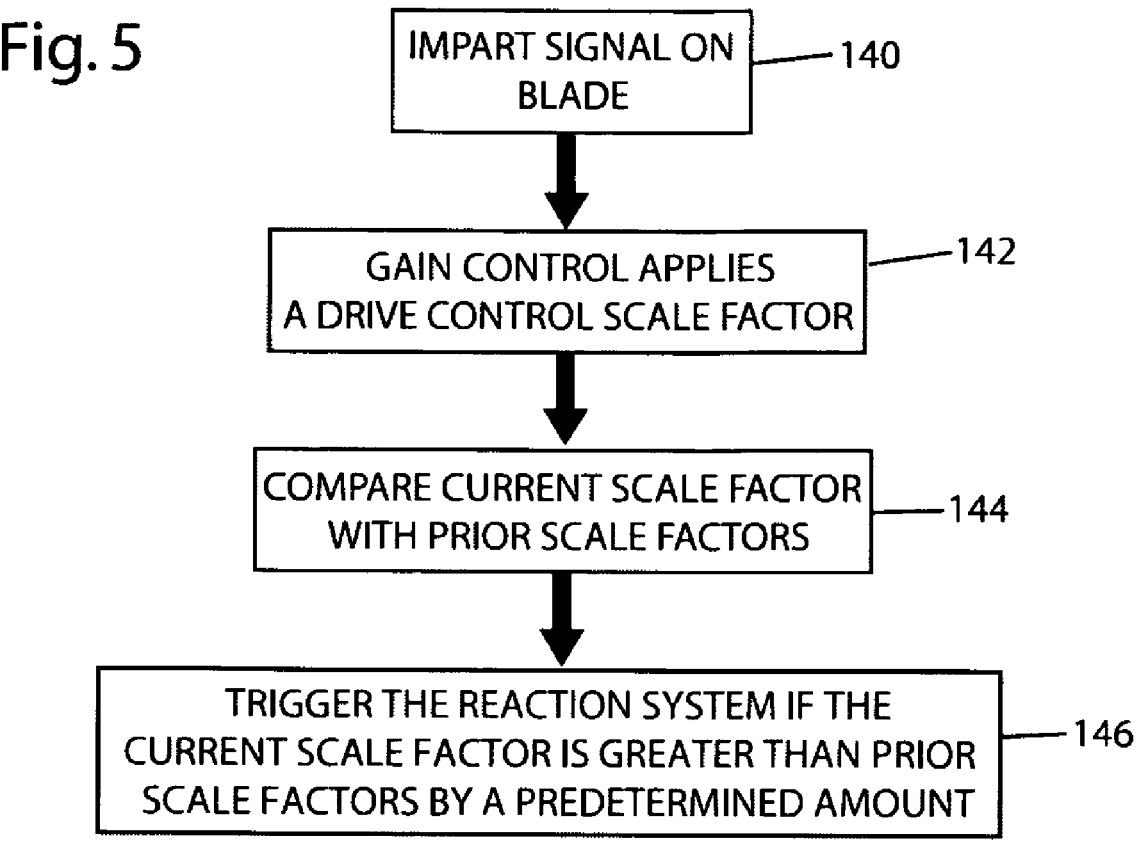
FIG. 5 is a flowchart of still another method of detecting contact.

FIG. 5 shows an embodiment of this fourth method of detecting contact. First, a signal is imparted to a designated portion of a machine, such as to the blade of a table saw, as shown at 140. A gain control tries to maintain that signal by periodically sampling the signal and applying a drive control scale factor to adjust the signal when necessary, as represented at 142. The method compares the most current drive control scale factor with prior drive control scale factors to see if the current factor has changed, as shown at 144. If the factor has increased by more than a predetermined threshold, then the method triggers the reaction system, as shown at 146.

In one implementation, the gain control produces a drive control scale factor four times during every 768 microsecond interval, and the method compares the most current drive control scale factor to one of the drive control scale factors from each 728 microsecond interval during the immediately prior 5 milliseconds. The system is preferably configured to have different thresholds for different historical values of the drive control scale factor. Specifically, older historical values of the drive control scale factor would be larger than for the more recent values. Thus, the threshold for the difference between the current value and the historical value from 2 milliseconds ago may be 1.8 times as large as the threshold for the change from 1 millisecond ago. The predetermined thresholds at which the method will trigger the reaction system may be set empirically. This detection method is particularly applicable for situations where the gain control may otherwise mask a drop in amplitude caused by a finger briefly contacting the side of a blade.

It should be noted that the threshold values for some or all of the above contact detection schemes may be scaled based on operational parameters or conditions experienced by the system. For instance, it may be desirable to scale down one or more of the long sum, short sum and falloff thresholds as the AGC increases the drive level. If the threshold values are scaled down inversely proportional to the drive level—i.e. if the drive level is doubled by the AGC, then the thresholds would be reduced by a factor of two—then the relative sensitivity of the system to detection of contact will be maintained relatively constant even when cutting wet wood, which would otherwise reduce the sensitivity of contact detection.

It may also be desirable to scale the thresholds at a level that is less than inversely proportional to the drive signal to cause the contact detection sensitivity to adjust to only partially compensate for the inherent change in sensitivity that would otherwise occur when cutting wet wood. Reducing or adjusting the sensitivity based on the apparent electrical impedance of the blade may be desirable to increase the resistance of the system to false trips while cutting wet wood.

Alternatively, if no AGC is used, the automatic adjustment of threshold values could be implemented by scaling down the thresholds proportional to the average value of the signal detected on the blade. Under this scenario, as wet wood decreased the apparent impedance of the blade, thereby causing the amplitude of the signal on the blade to drop with a constant drive signal, the thresholds would scale down correspondingly to maintain a relatively constant threshold sensitivity. In either case, it should be understood that scaling the sensitivity could be implemented by directly adjusting the numerical value of the sensitivity or by making a corresponding adjustment to scale the signal level by a corresponding amount. By way of example, it is roughly equivalent to either divide the threshold value by two or multiply each dV/dt value by two prior to adding them to the sum.

In addition to scaling the threshold values to maintain a relatively constant sensitivity, under some circumstances it may be desirable to scale the sensitivity of the system based on the noise currently being experienced by the system. For instance, if the noise level is high, but below the threshold to be detected as contact, the threshold for registering contact can be raised to increase the resistance to false trips from such noise. Then, when the noise level is lower, the thresholds can be lowered to thereby improve the sensitivity to contact. By way of example, the threshold for detecting contact with the long sum technique may include a term that is proportional to the recent values of the long sum. More specifically, for instance, the long sum threshold could be set adaptively to be equal to one half of a nominal non-adaptive threshold+one half of the average value of the long sum over the last 5 milliseconds. In this way, the sensitivity when noise levels are low, as evidenced by a low average value for recent long sums, will be higher while maintaining good resistance to false trips when noise is higher, such as when cutting wet wood.

The above described types of adjustment of the contact detection threshold or sensitivity can be described as an active or adaptive sensitivity contact detection system since the sensitivity is adaptive to the current conditions experienced by the system. Various portions of this adaptive sensitivity contact detection system are illustrated and embodied in the attached code.

The four methods disclosed above may be implemented together in one detection subsystem. Implementing all four methods improves the likelihood of detecting contact between a person and a designated portion of a machine in a variety of accident scenarios. It also improves the ability of a detection subsystem to distinguish contact between a person and the blade from contact between the blade and other materials such as wet or green wood. If any one of the four methods detects a contact, then the detection subsystem would trigger the reaction system to minimize any potential injury. It should also be understood that the detection subsystem could look for a particular pattern or combination of over-threshold values from one or more of the different methods to further enhance the resistance to false triggers of the reaction subsystem.

The parallel operation of two or more detection systems, as described above, can be described as a multifaceted contact detection system. It should be noted that the so-called parallel or multifaceted operation does not require simultaneous execution on a microprocessor instruction level, although that could be possible with some processors, but rather to the property that the detection schemes are operating to look at the data associated with a single contact event in different ways, even though the data each scheme is looking at could be different. For instance, one scheme could be looking at the phase of the signal on the blade and the other could be looking at the voltage characteristics. Therefore, the computations associated with determining contact may be carried out sequentially for each scheme one after the other or partially interspersed.

In the case where the thresholds in the different schemes are interdependent in some way, such as where the fall off threshold is scaled based on the recent values of the long sum, the multiple parallel detection schemes can be described as being selectively interrelated in that the output of one scheme is dependent on the operation of the other scheme or schemes.

It is important to again emphasize that although the methods described above have been discussed primarily in terms of amplitudes of a signal on a blade or of a drive control scale factor, the methods also can be implemented by looking at other aspects of the signal or the gain control. More generally, as stated, the methods are monitoring the electrical impedance of the blade, and the amplitude of the signal and the drive control scale factor are related to that impedance. The methods could be implemented with values related or proportional to other characteristics of the impedance, such as the phase of the signal on the blade or the gain control, current delivered to the blade, or any other variable related to the electrical impedance of the blade.

In the event of a contact event, it is possible to store some or all of the data associated with that contact event to a permanent memory, such as flash. This flash could be either built into the DSP or an external chip. Whatever type of permanent memory device is provided, it could be implemented inside the cartridge or as some other part of the electrical system connected to the cartridge and could be permanently installed in the cartridge or elsewhere on the machine or implemented as a removable component. Generally speaking, it is desirable to move the data currently stored in RAM to the flash so that the data can be subsequently downloaded to provide a picture of the status of the system at the time contact was registered and thereby information on what caused the contact event. By having users return or provide access to the data stored in the fired cartridges or other element, it is possible to download and analyze the stored data. A method is thereby provided of acquiring data of actual human contact events, which is not otherwise easily feasible to acquire due to the injury that results from contact. In addition, if the operator reports that no contact occurred, being able to look at the historical values stored in RAM provides some information on what might have caused the false trip so that corrective action can be taken. Thus, the described system can provide information on the cause of false contacts or actual contact events. The method of acquiring data may be described as follows: A method for acquiring data related to the triggering of a system designed to detect and trigger upon a dangerous condition between a human and a dangerous portion of a woodworking machine, the method including: distributing a plurality of such systems; detecting a trigger of the system; storing data associated with the trigger in a permanent memory device associated with the system; and reading the data from the permanent memory device. This method may further include the step of recovering at least a portion of the system, wherein the recovered portion includes the permanent memory device. The permanent memory device may be housed in a replaceable module, and the method may also include the step of providing a free replacement module in exchange for a module that has trigger data stored therein.

The methods discussed above may be implemented in power equipment in numerous ways through a combination of hardware, firmware and/or software. In saws, it is often desirable to incorporate the hardware, firmware and/or software into a replaceable brake cartridge, such as cartridge 80 discussed above. By so doing, the hardware, firmware and/or software may be revised or updated simply by changing the cartridge.

Figure 6:
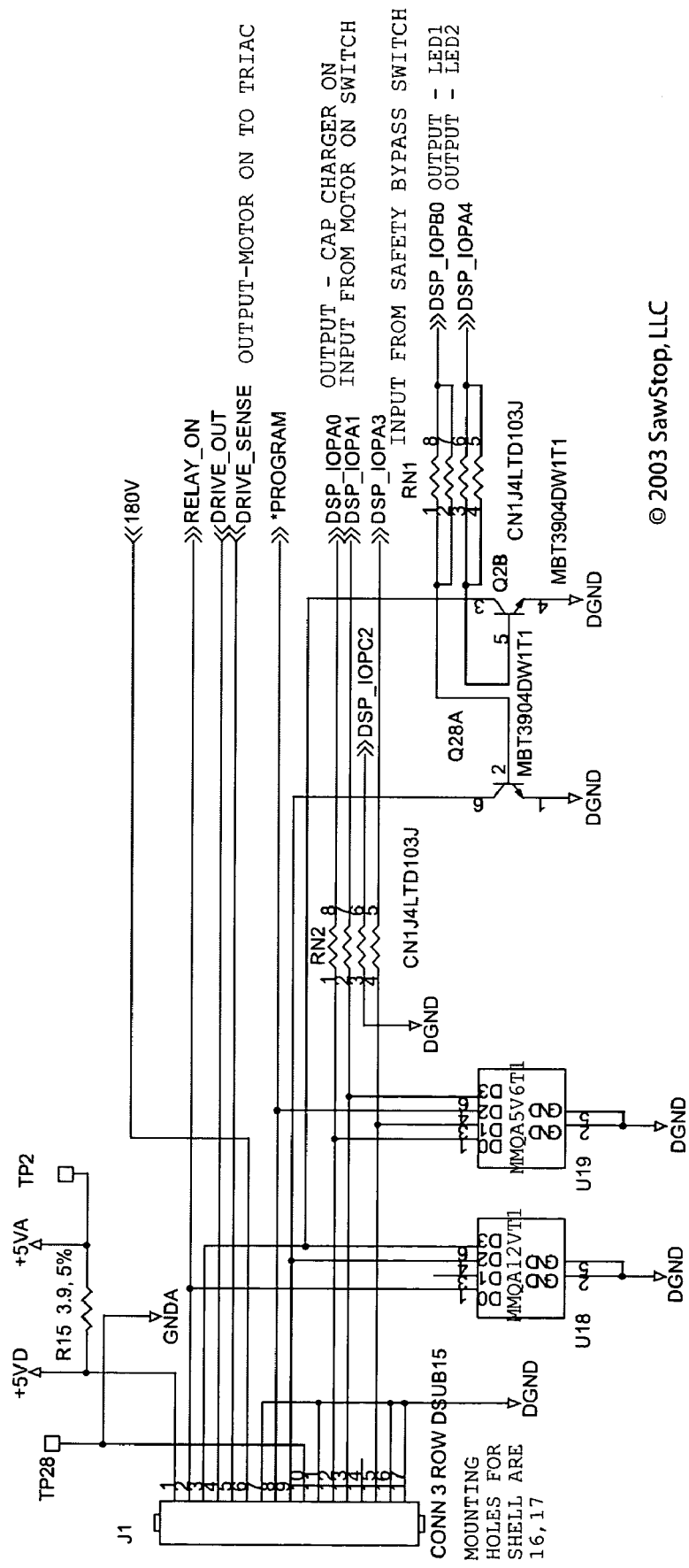
FIG. 6 is a diagram of connections between various components in a machine.

FIG. 6 shows an example of using a DB15 connector to connect the electronics in the cartridge to a power supply, to a sensor assembly comprising arbor electrodes (similar to contact detection plates 44 and 46 discussed above), to switches, to a motor, and to an output display such as LEDs. Transient voltage suppressors U18 and U19, as well as isolation resistors RN2 provide static discharge protection.

Figure 7:
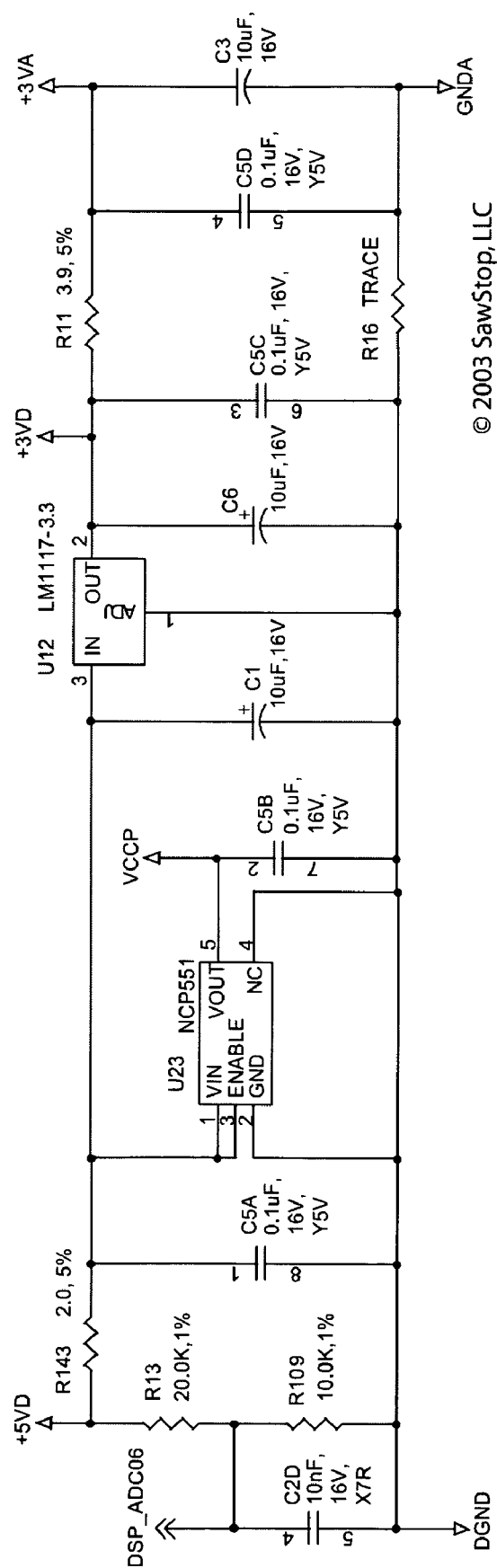
FIG. 7 is a diagram of a voltage regulation circuit that may be used with a cartridge as described herein.

FIG. 7 shows an example of voltage regulation circuit that may be used with the cartridge. It shows the use of local regulation on the board and isolation of the analog power rail from the digital power rail, preferably by a small series resistance R11 and shunt filtering capacitors C5D and C3. DSP_ADC06 is connected to an analog to digital converter (ADC) input on a DSP to provide monitoring of the power supply for the cartridge.

Figure 8:
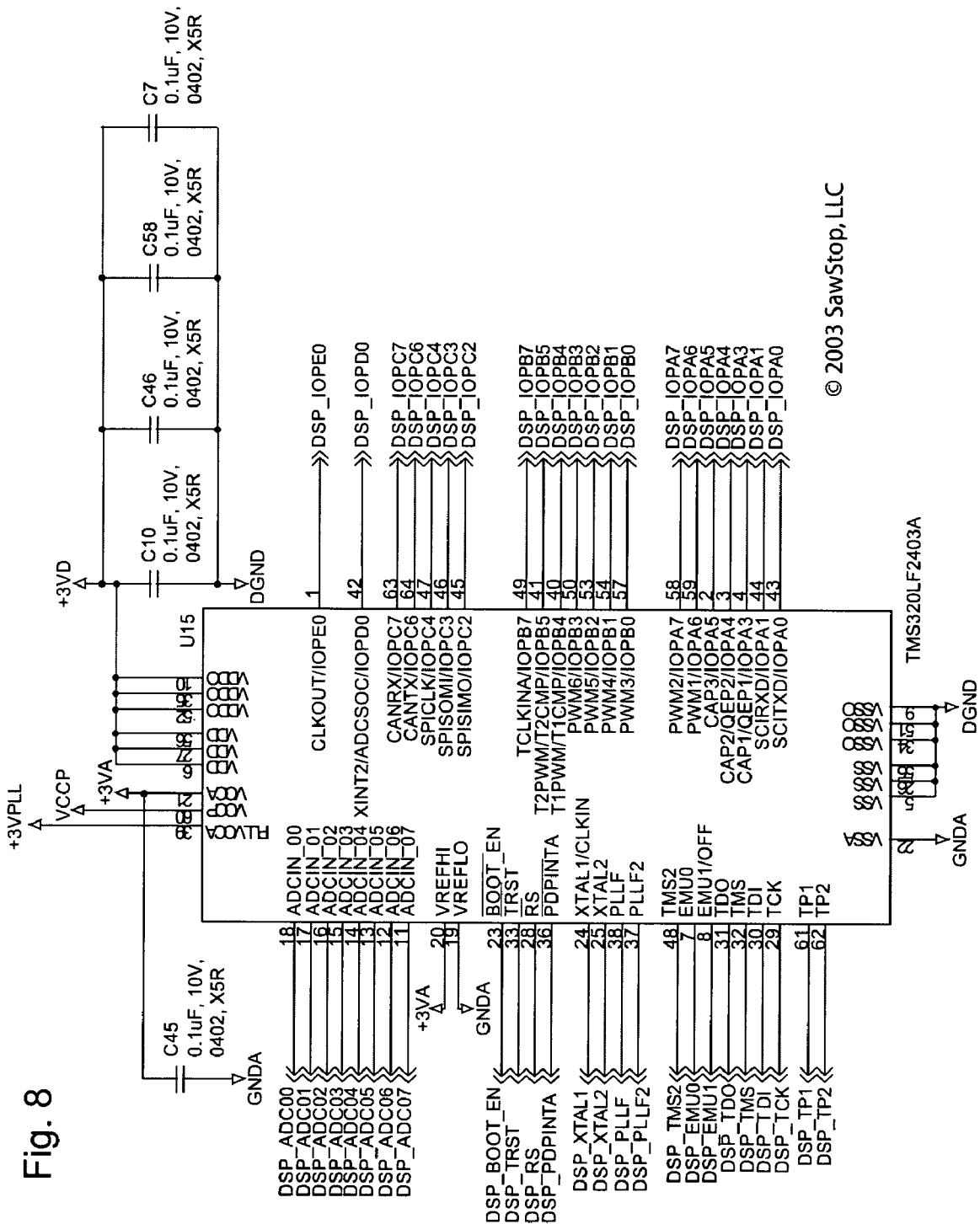
FIG. 8 is a diagram of a signal digital processing microcontroller used to control the circuits described herein.

FIG. 8 shows a digital signal processing (DSP) microcontroller used to control the circuits described herein. The DSP includes a multi-channel, internal, analog-to-digital converter (ADC) input and internal pulse-width modulator (PWM) outputs, as well as clock, timing, RAM, ROM and flash memory functions. FIG. 9 shows a provision to program the DSP and flash memory from an external source, such as through the DB15 connector shown in FIG. 6. The cycle time of the DSP is selected as 25 nanoseconds, defined by crystal Y1 shown in FIG. 10. A reset chip U6, shown in FIG. 11, is used to hold the DSP in reset unless the power supply is at proper operating voltage. FIG. 12 shows a phase lock loop used with the DSP.

A switch SW1, shown in FIG. 13, is one means of passing information to the DSP. For example, a cartridge may be constructed so that switch SW1 is not closed unless the cartridge is properly positioned and installed. In that case, switch SW1 would signal to the DSP whether the brake cartridge is properly installed and positioned in the saw. If the cartridge is not properly positioned, the DSP would not allow the saw to run.

Figure 14:
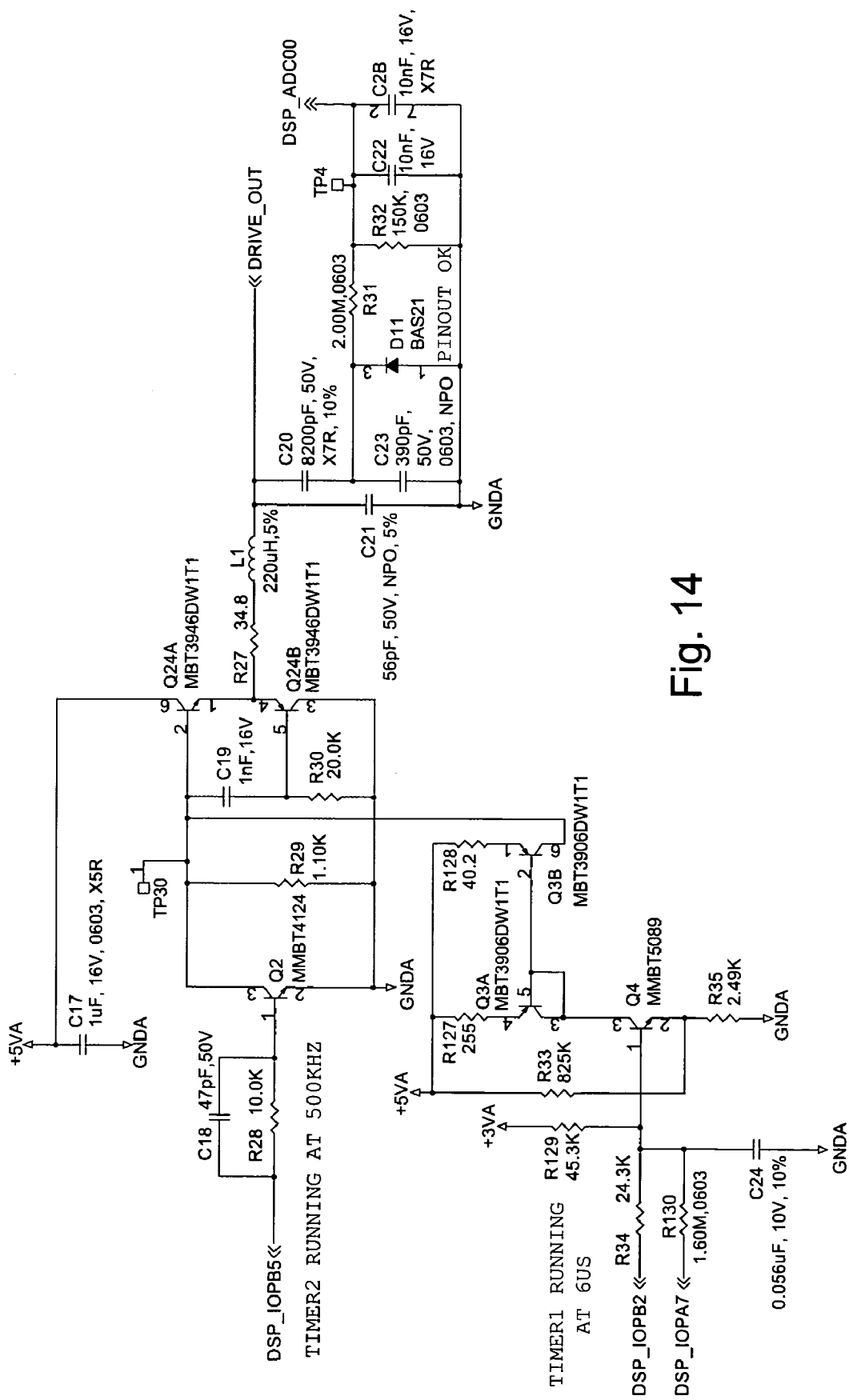
FIG. 14 is a diagram of a circuit for a 500 kHz driver.

FIG. 14 shows a circuit for a 500 kHz driver. The objective of this circuit is to generate a 500 kHz sine wave whose amplitude is controllable by firmware. This sine wave signal drives the capacitive coupling electrode to impart a signal onto the blade. Preferably, the sine wave signal should be adjustable over a range of approximately 3 Vp-p to 30 Vp-p (3 to 30 volts peak-to-peak). It is also preferable that it be possible to turn off the driver completely. A suitable adjustable voltage resolution is about ⅛% of full scale, although other values could be used. In addition, it is desirable that the output voltage be known to an accuracy of a few percent in order to detect the distance between the blade and the brake pawl by measuring the amount of signal induced on the pawl for a known voltage level on the blade. Detecting the blade-to-pawl spacing is one way to insure the cartridge is properly installed and to insure that a blade with a predetermined diameter is installed in the saw.

The basic approach used in the driver is to generate a 500 kHz square wave source of variable amplitude, and drive a resonator to create the sine wave output. Note that a 1 Vp-p square wave has a sine wave fundamental component of about 1.3 Vp-p. Thus, the first problem is how to generate a low impedance square wave of variable amplitude.

A simple approach would be to use a variable pulse width modulated signal at 500 kHz, and vary the duty cycle of the PWM to achieve the desired average amplitude. However, in some applications, this approach may not achieve the desired resolution in amplitude.

In the depicted embodiment, the power supply rail can vary between 5.5 to 7 volts and the amplitude output should be fairly independent of the momentary changes in the rail voltage. It will be seen below that because of the chosen Q of the resonator it will be necessary for this square wave to have a maximum amplitude of close to 5 Vp-p. The combination of these two factors lead to the topology of using a variable current source driving a resistor to create a variable amplitude voltage, switching this voltage on-off by shunting the current with a switching transistor, and connecting the resulting variable amplitude square wave to emitter follower outputs that have a low impedance output. Referring to the schematic shown in FIG. 14, the variable current source is formed by Q4/Q3a/Q3b, the resistor is R29, the shunt switching transistor is Q2, and the output emitter follower transistors are Q24a/Q24b.

The variability of the current source is provided by a pulse width modulated clock signal from the microprocessor driving an RC circuit, resulting in a variable voltage. To get sufficient resolution in the voltage, two PWM outputs (DSP_IOPB2 and DSP_IOPA7) are used, scaling their values and summing them together with resistors R34 and R130. Capacitor C24 provides sufficient filtering of the ripple of the PWM signal as well as the desired response time of the driver control circuit. Transistor Q4 and R35 convert this variable voltage into a variable current that is then mirrored and scaled by the Q3a and Q3b circuitry. The result is a variable current source that will operate close to the positive supply rail or to ground, providing the necessary output voltage. The Vbe drop of Q4 introduces a dead zone at the low end of the transfer function between PWM code and output current, so R129 provides an offset to minimize this dead zone. There will be some effect of temperature on the dead zone, but the actual driver output level will be adjusted in a feedback control loop, so the dead zone only needs to be a small percentage of the total range to have minimal affect on the gain of the circuit. There will be a second order effect of the power supply rail variation changing the current due to the Early voltage of the transistors, and this is compensated out by R33.

The switching transistor Q2 is chosen to have a low saturation voltage, and is driven with a base RC network that will turn it off quickly but will avoid excessive charge storage in the base-emitter junction. A MOSFET having a slightly lower voltage when turned on may be used, but may also have a higher cost. It should be noted that the driver can be turned off by simply stopping the switching of Q2.

Complementary emitter follower transistors provide a low impedance output that drives near the rails. The RC network of C19 and R30 permit the base of Q24b to be driven below ground to get the widest possible output voltage.

The resonator is formed by L1 and C21, C20, C23, and any reactance loading at the DRIVE_OUT node. Economics motivate the use of a 5% tolerance on the inductor and capacitors, with additional uncertainty due to temperature. In addition, the capacitance looking out the DRIVE_OUT port can vary between a nominal level when the blade is not loaded to a higher level when sawing wet wood, and it is desired to have this variability affect the amplitude of the signal at DRIVE_OUT by only a few percent. These factors, combined with the desire to generate the voltage range of 3 to 30 Vp-p at DRIVE_OUT, led to the use of a Q=10 in the resonator. This Q is set by the resistor R27 combined with the typical loss in the inductor. If the resonator is centered at 500 kHz then the maximum output voltage will be in excess of 50 Vp-p. However, under worst case conditions of resonator tuning, the output voltage can still achieve 30 Vp-p. Multiple capacitors were needed to define the exact center frequency of the resonator from standard values. C20 also is used in a detector circuit with D11, and can be 10% tolerance because it has a small reactance in comparison with C23.

Diode D11 creates a level detector that permits measurement of the output level of the driver to within about 1 percent if 0.1% tolerance resistors are used in the R31/R32 divider. The DC component of the voltage at the cathode of D11 is directly proportional to the sine wave level at the driver output; a low-pass filter formed by R31, R32, C22 and C2B roll off the 500 kHz to provide just the DC component to the A/D converter. Other techniques are possible for measuring the output level of the driver, including direct sampling of one of the node waveforms by an A/D converter.

Figure 15:
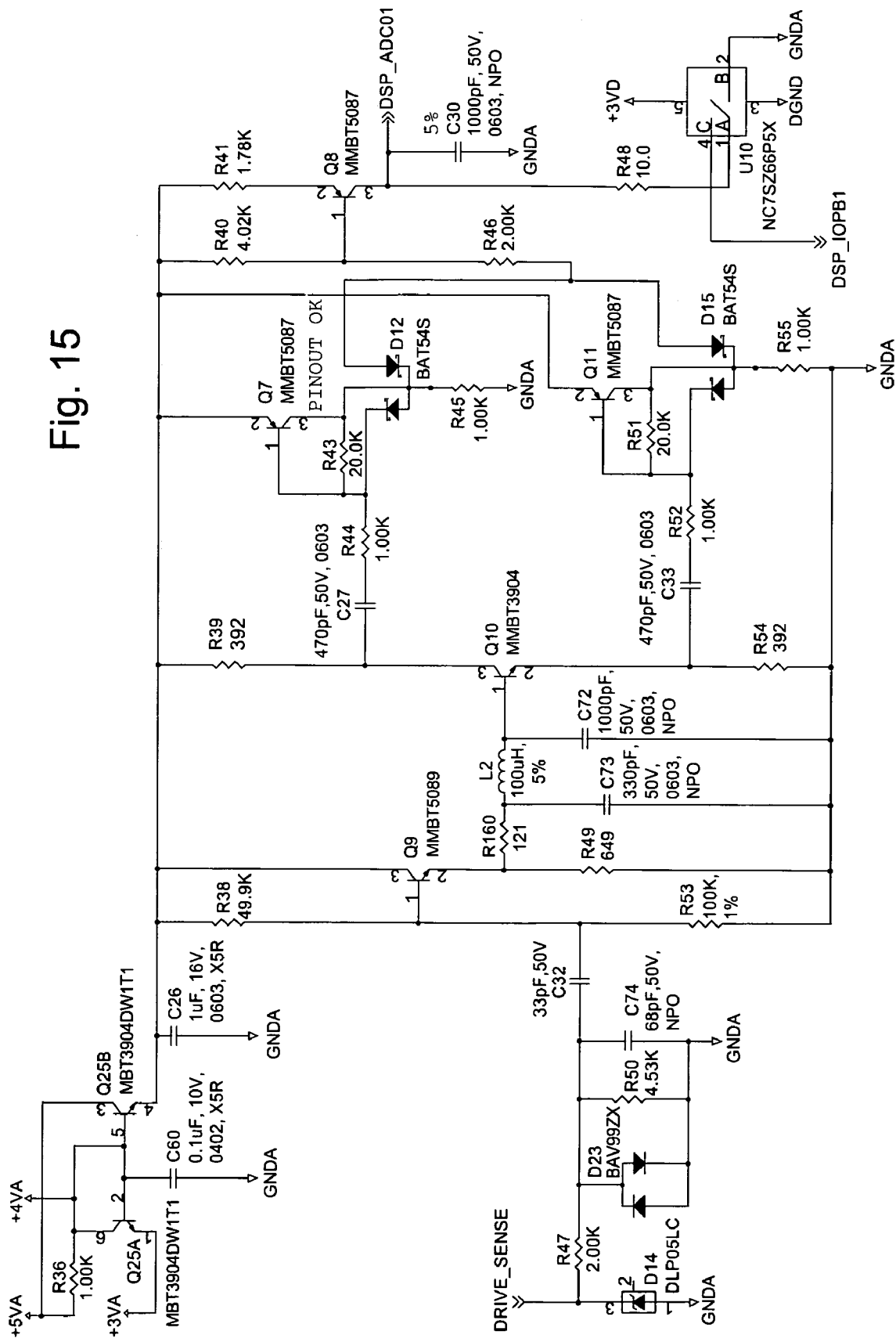
FIG. 15 is a diagram of an integrator circuit.

FIG. 15 shows an integrator circuit that may be used in the above-described methods. The objective of the integrator is to provide a way to periodically measure the amplitude of the driven signal. In the depicted embodiment this driven signal is at 500 kHz and the measurement period is every 6 microseconds. This circuit is preferably designed to minimize immunity to spurious signals at other frequencies, as well as to provide relative immunity to electrostatic discharge from events such as the charging of the blade/arbor from a rubber drive belt or cutting of non-conductive materials. However, it should be understood that this function could be accomplished many different ways including with a peak amplitude detector, a power detector, or direct sampling of the signal with an A/D converter to measure the amplitude of the signal. Also, although the measurement in the present circuit is carried out at discrete time intervals, it should be understood that such a measurement could be carried out continuously.

The topology of the circuit is to amplify and full wave rectify the signal at the node marked DRIVE_SENSE, and then drive an integrator that is sampled at the end of the measurement period and then reset. The measurement period was chosen to be synchronous with the drive signal and to be an integer multiple of the number of cycles of the drive signal to minimize ripple in the measurement. The integration is performed by current source Q8 driving integrating capacitor C30. U10 has sufficient current carrying capability to quickly reset the voltage on C30 to zero after each measurement. Q10 is a phase splitter to split the measurement signal into two components 180 degrees out of phase. These outputs are followed by the Q7 and Q11 stages, which non-symmetrically amplify only the positive peaks coming through their input coupling capacitors. The net effect is a full wave rectified version of the measured signal appearing at R46, which drives the integrator. It should be understood that there are a number of other circuits that could provide this full wave rectifier function, including diode rectifiers. Q9 is a buffer that presents a high impedance load at its input and a low impedance source at its output to drive a filter. Q25a and Q25b in conjunction with C60 and C26 form a filtered low impedance power supply.

Amplitude and frequency filtering is used throughout this circuit to minimize interference by spurious signals. A high pass filter is formed due to the capacitive coupling of the arbor electrode and the input impedance of this circuit. Diodes D14 and D23 provide two levels of clipping of the input voltage to prevent ESD spikes from damaging other circuit elements and disrupting the measured amplitude. R47 and C74 form a low pass filter to block high frequency noise. Coupling capacitors such as C32, C33 and C27 form high pass filter elements that reject low frequency spurious signals. Network C73, L2 and C72 is a band pass filter. The combined effect of these coupling elements, low pass, and band pass filters is an overall band pass filter function centered on the expected frequency of the sensed signal, typically about 500 kHz. This reduces the opportunity for noise to get into the circuit and disturb the resulting measurement.

In addition to the filtering provided by analog elements in the circuit, the attached code implements a type of digital filtering on the signal to further reduce noise. In particular, the integrator output is digitized just prior to reset and the result is a 10 bit binary number, typically around 600 if no perturbations affecting the impedance of the blade. Changes in this value are clipped so that they are recognized only to the extent they are smaller than a threshold value—MaxStep—in the code or to the extent that the next value changes in the same direction as the first change. Typical values of MaxStep are between 1 and 50 and will depend on the specific impedance and noise characteristics of the saw.

In addition to the above described digital filtering, the attached code also implements a type of hysteresis filtering whereby changes in integrator values are only recognized to the extent they exceed a threshold step. The threshold step can be made dependent on whether the step is a positive or negative change and whether the step is in the same direction or opposite direction as the prior step. Since the dV/dt values are the changes in integrator count from sample to sample, eliminating small variations in the integrator count reduces the effect of noise on the sums that are used to detect contact, by eliminating the effect of many small changes and instead only recognizing relatively large changes such as might be induced by a contact event.

In some implementations, such as in a table saw, a metal brake pawl is positioned adjacent the perimeter of a blade and it is desirable to detect whether the pawl is sufficiently close to the blade or otherwise positioned properly. It is also sometimes desirable to confirm that a blade with a predetermined diameter is installed in the saw. These functions can be accomplished by detecting blade-to-pawl spacing. This can be accomplished by a variety of techniques including but not limited to mechanical, optical, electrical and/or magnetic means.

Figure 16:
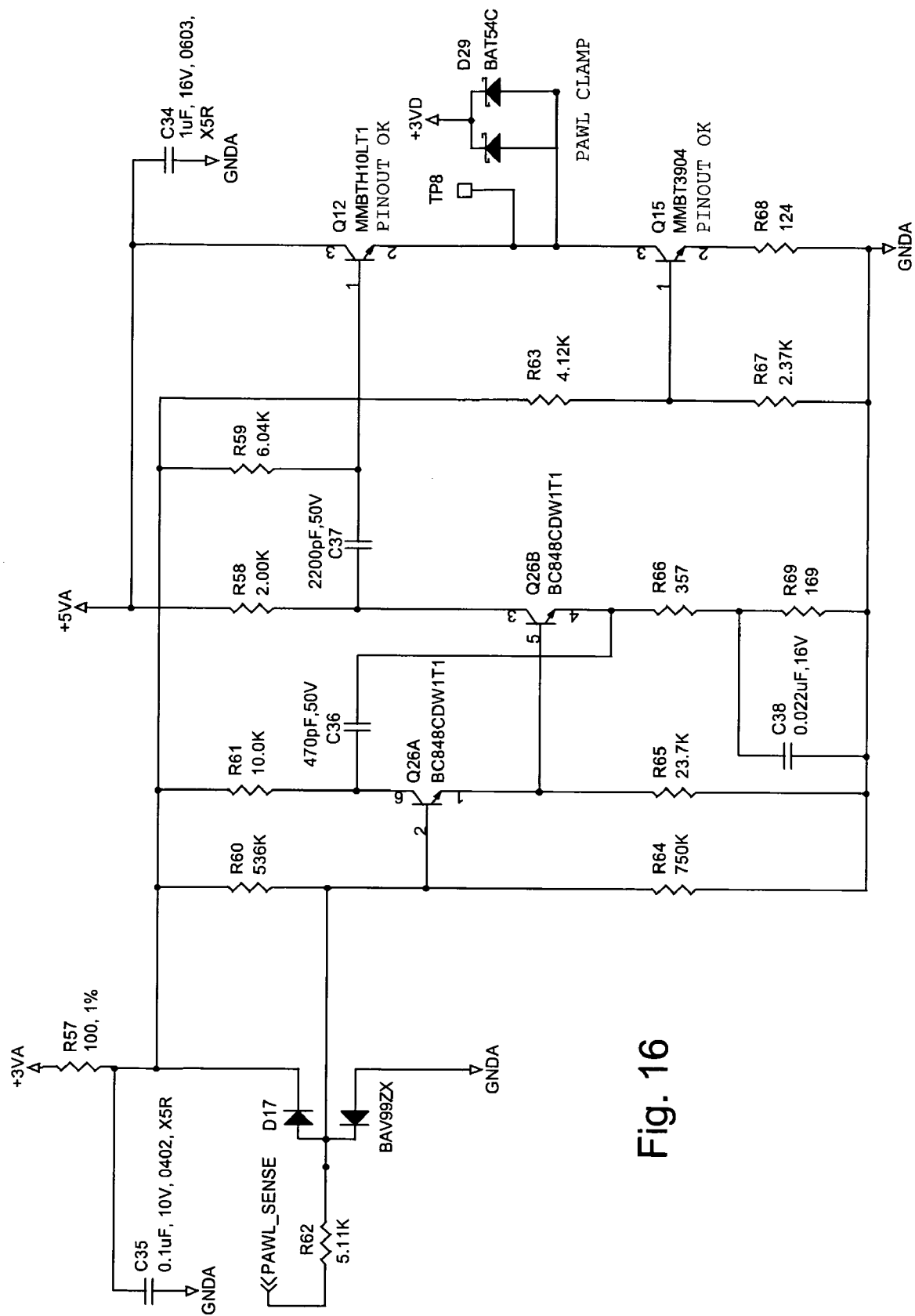
FIG. 16 is a diagram of a circuit that can be used to detect electrically the spacing between a blade and a brake pawl.

FIG. 16 shows one circuit that may be used to electrically detect blade-to-pawl spacing. The depicted circuit makes an accurate measurement of the portion of the drive signal going to the saw blade coupled to the metal brake pawl. The DSP uses the ratio of the drive signal to the detected signal on the pawl to determine a transfer function, and infers the gap with prior knowledge of the relationship of gap distance to the transfer function. The Pawl Sense circuit is an amplifier whose input is connected to the metal brake pawl and whose output drives the A/D converter. The A/D converter directly digitizes the pawl signal and determines its amplitude in firmware, although other techniques are possible such as using a detector circuit.

This amplifier should have a very high input impedance as it provides the load for the approximately 2 pF capacitive coupling between the saw blade and the pawl. It also should have an output impedance that is low enough to drive the A/D converter input without error. It is desirable to have some gain that is known and stable over environmental conditions to within a few percent. Finally, it should also withstand static discharge of the saw blade without damage.

Static protection is afforded by R62 and low capacitance diodes D17. Diodes D29 at the output help protect the A/D input from discharges that would otherwise overdrive the voltage into the A/D.

High input impedance requires both a high input resistance and low input capacitance. This is achieved first by using a high gain transistor for Q26a, which means that the associated bias resistors can be high and the low frequency impedance looking into the base is high. In addition, a bootstrap technique is used to cancel the collector-base capacitance of Q26a which would otherwise lower the input impedance: an in-phase low impedance signal at the emitter of Q26b is coupled through C36 to the collector of Q26a to make that collector be almost perfectly in-phase with the signal at the base, canceling the capacitance between the two.

Q26b provides gain for the pawl signal. Q12 is a unity gain buffer that is operated at such a current so as to provide a low output impedance to drive the A/D converter input.

Figure 17:
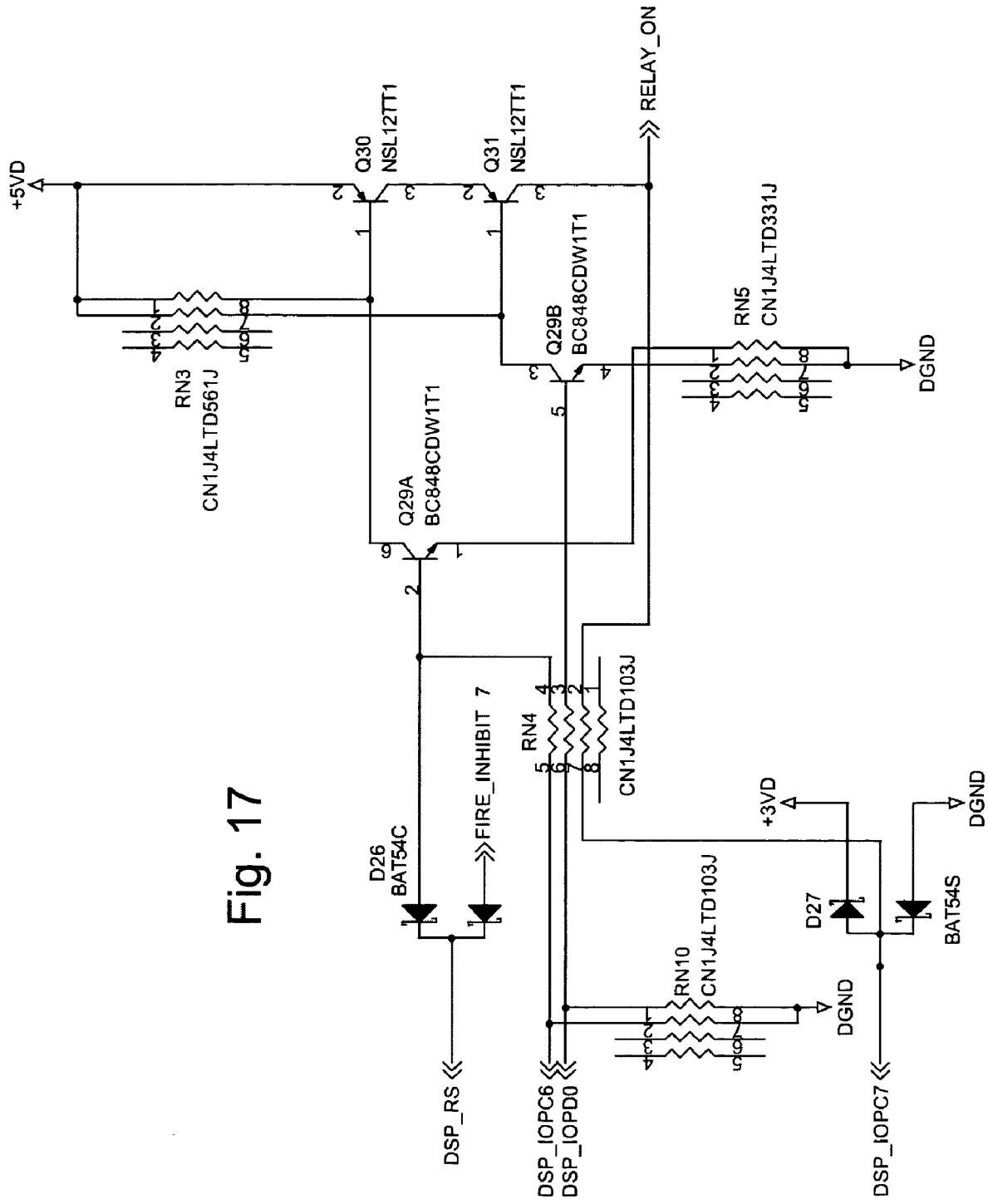
FIG. 17 is a diagram of a circuit used to power motor control relays.

FIG. 17 shows a circuit used to power motor control relays. One feature of the relay driver is the use of series redundant pass transistors (Q30 and Q31) which are preferably controlled independently, and from separate microcontroller ports, to keep a single failure from turning on the relay that powers the saw motor. In addition, the microcontroller reset controller locks one of the pass transistors off through D26 during power-up or power-down to further ensure that the relay does not turn on at the wrong time. The microcontroller can test the integrity of the two pass transistors via the feedback path between the relay coil and DSP_IOPC7: one pass transistor can be turned briefly on at a time and the microcontroller can tell if just one pass transistor is enough to provide power to the relay, indicating that the other has failed shorted.

Figure 18:
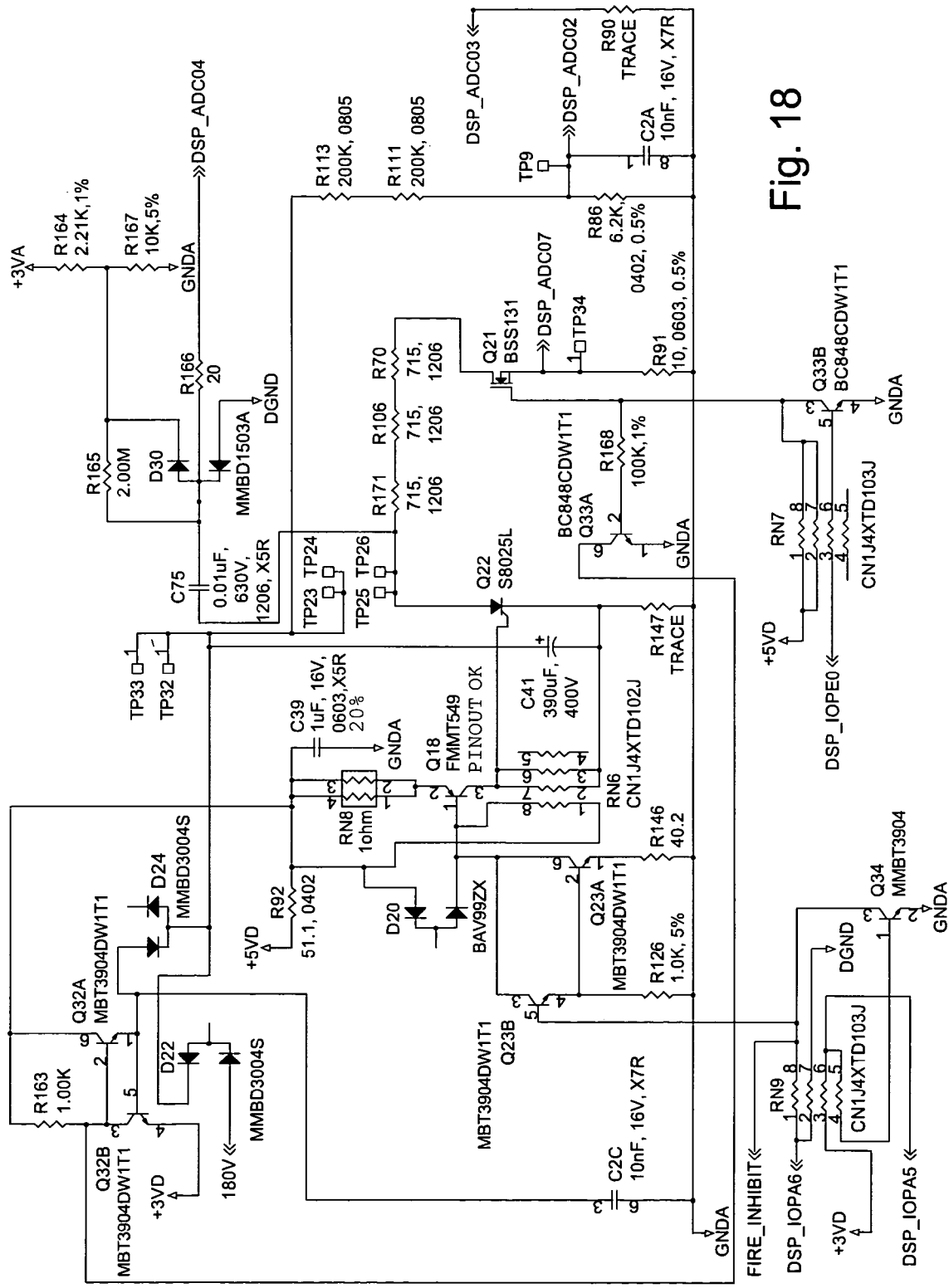
FIG. 18 is a diagram of a circuit used in a firing subsystem as described herein.

FIG. 18 shows a circuit used in firing subsystem 76, discussed above. In this circuit, an SCR is used to discharge a high voltage capacitor C41 through a fuse wire in order to melt it open and thus release a stored energy source such as a spring to drive the brake pawl against the saw blade. In this circuit, the fuse wire extends between locations TP23TP24 and TP25TP26. In order to melt the fuse wire, the SCR must conduct hundreds to thousands of amperes for a few tens of microseconds. To ensure that the SCR turns on fully and quickly it is desired to deliver in excess of 1 ampere of current quickly into the gate. This is done with transistor Q18 that is configured as a current source. It may be necessary to limit the amount of time this high gate current flows in order to avoid over-dissipating the SCR gate or the drive circuits. This is achieved by supplying the majority of the SCR trigger current with C39, so that the current drops to a much lower value after the initial current surge. This time limit can be additionally achieved by limiting the amount of time that the control line from the microcontroller is asserted. The control line labeled FIRE_INHIBIT is connected to the microcontroller reset circuit and serves to disable the SCR from triggering during power-up or power-down of the board.

In order to confirm the functionality of the circuit, means are provided to test trigger the SCR at a low voltage on C41, typically 3.3V, so that there is insufficient current to overstress the fuse wire but enough current to permit verification that the firing circuit is functional. High voltage capacitor C41 is charged up to typically 3.3V by the action of the Q32a/Q32b/D24 circuit. Then the SCR is triggered and the voltage on C41 is monitored, either through a voltage divider (leading to DSP_ADC07 or DSP_ADCO2) or through C75 which is an AC coupled circuit that permits monitoring the change in voltage on C41 with time.

Means is also provided to measure the capacitance of C41 to insure it is functioning as intended. This can be accomplished without interfering with the ability of the capacitor to deliver sufficient current to melt the fuse wire, so it can be performed repeatedly throughout the life of the capacitor even if the circuit is being called upon to provide continuous protection. With the capacitor charged to a target voltage, typically around 180V, a momentary load is applied to the capacitor and the resulting change in voltage is monitored and the capacitance can be calculated from this voltage change. If this load is applied for a short period of time, typically 5 milliseconds or less, then there will only be a small percentage change of voltage on the capacitor C41, typically ½ percent, and so sufficient charge remains available in C41 to melt the fuse wire if called upon to do so. The load is provided by resistors R171/R106/R70 and MOSFET switch Q21, with a provision for measuring the current through those resistors by measuring the voltage across resistor R91. The voltage change across C41 resulting from that load is preferably monitored through AC coupling capacitor C75 because only a few volts change on C41 gives a full scale change to the A/D converter input through this path, and so is more sensitive to the voltage changes on C41 than through a voltage divider path such as goes to DSP_ADCO2. Various combinations of applying a load and measuring the resulting voltage change can be used to measure the capacitance of C41. Alternatively it is possible to calculate the capacitance of C41 by monitoring the time it takes to charge up, or by monitoring the voltage characteristics with time during the low voltage discharge test.

Means is also provided to prevent discharge of C41 out through the board connector, such as when the replaceable cartridge is removed from the saw, which could result in a shock to a person handling the cartridge. This is accomplished through redundant series diodes D22.

The exemplary circuits shown in FIGS. 6 through 18 may all be implemented on a circuit board housed in a replaceable cartridge, as explained above.

Figure 19:
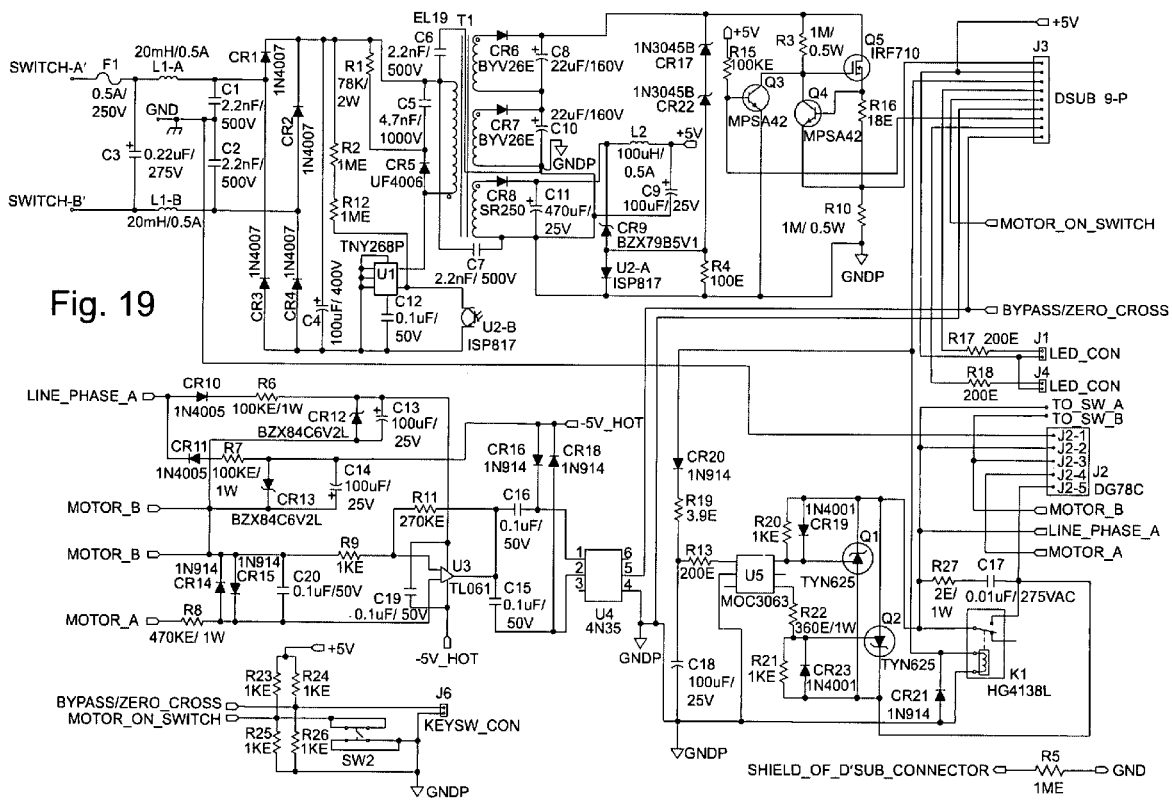
FIG. 19 is a diagram of a power supply circuit.

FIG. 19 shows a power supply circuit that may be implemented in power equipment such as a table saw and is suitable to use with the above described cartridge circuit. The power supply would receive line power, transform it as necessary, and supply power to the brake cartridge. In the circuit shown in FIG. 19, a universal 110V/240V, 50 Hz/60 Hz input switching power supply is used to provide isolated power to the cartridge. There are two outputs of this supply: a typically 5.5V supply to power most circuits on the cartridge, and a typically 200V high-voltage supply used to charge capacitor C41 (shown in FIG. 18) that provides the energy to melt the fuse wire, as discussed above. Feedback is provided to the switching controller integrated circuit U1 via an opto-isolator circuit U2 that monitors when either supply is above its set point.

The high-voltage supply can be switched on or off by Q3. In addition the output current is limited by Q4 and Q5 to typically 30 mA. This ensures that C41 on the cartridge board reaches its operating voltage more quickly than if a simple current limiting resistor was used.

It is desirable to prevent the brake cartridge from firing if a person touches the blade when it is not spinning. This is accomplished by monitoring when the blade is spinning, and disarming the brake cartridge if the blade is not spinning. In the depicted circuit, the output from a zero-cross detecting circuit (U3) is used by the DSP or microcontroller on the cartridge board to detect when the saw motor (and thus the saw blade) is turning slower than a certain rotational rate. This information is used to disarm the brake pawl from firing when the blade is essentially not spinning. This zero-cross detector measures the reverse-EMF of the motor and is coupled to the microcontroller through an optical coupler U4 for electrical isolation.

Relay K1 is used to switch power to the saw motor. To minimize arcing across the relay contacts, a bypass circuit composed of Q1/Q2/U5 is used to optionally bypass current around the relay contacts just before the relay contacts are closed and for a short period after the relay contacts are opened. Because current flows in this bypass circuit for only a fraction of a second before relay contact closure or after contact opening, less expensive low power components can be used than would be otherwise necessary if it carried the current for indefinite periods. It would be possible to control this bypass circuit from a separate control line, but use of control lines can be minimized by multiplexing this bypass control on the same line that energizes the relay coil. A low duty cycle pulse train, typically 10%, initially sent to the relay coil does not have sufficiently high voltage to energize the relay, but gets detected through CR20 by SCR driver U5 which then turns on SCRs Q1 and Q2 to bypass the relay contacts. After a short period of time, typically 400 milliseconds, the duty cycle of the pulse train is raised to 100% to energize the relay coil. When it is time to deactivate the relay the duty cycle is dropped to a low value again, typically 10%, and held there for typically 400 ms while the relay contacts open. Arcing across the relay contacts is thus minimized because current is diverted around the contacts before they close or after they open. In the case of larger motors, the relay may be used just to energize the coil on a contactor to control the larger motor, rather than controlling the motor directly.

Means is provided in the circuit depicted in FIG. 19 to dissipate static charge that may be present on the cartridge board when it is removed from its packaging and before it mates with its connector. The shield of the D-sub connector in the saw is connected to ground via resistor R5, thereby providing a discharge path. Static charge may then dissipate when the cartridge contacts the shield before it mates with the connector.

A user interface between the operator and the microcontroller on the cartridge board is also provided in the power supply shown in FIG. 19. Switch contacts SW2 and J6 are available to notify the microcontroller that the operator wishes, for example, to turn on the saw motor or operate the saw without the protective system enabled. Additionally the microcontroller can notify the operator of status information by pulling lines J3-4 or J3-8 to logic low to activate indicators such as LEDs or buzzers.

The circuit shown in FIG. 19 may be housed in a switch box mounted on the saw. A possible switch box is described in U.S. Provisional Patent Application Ser. No. 60/533,598, entitled "Switch Box for Power Tools with Safety Systems," filed concurrently with the filing of this application and naming Stephen F. Gass, James David Fulmer and David A. Fanning as inventors, which application is hereby incorporated into this document by reference.

Figure 20:
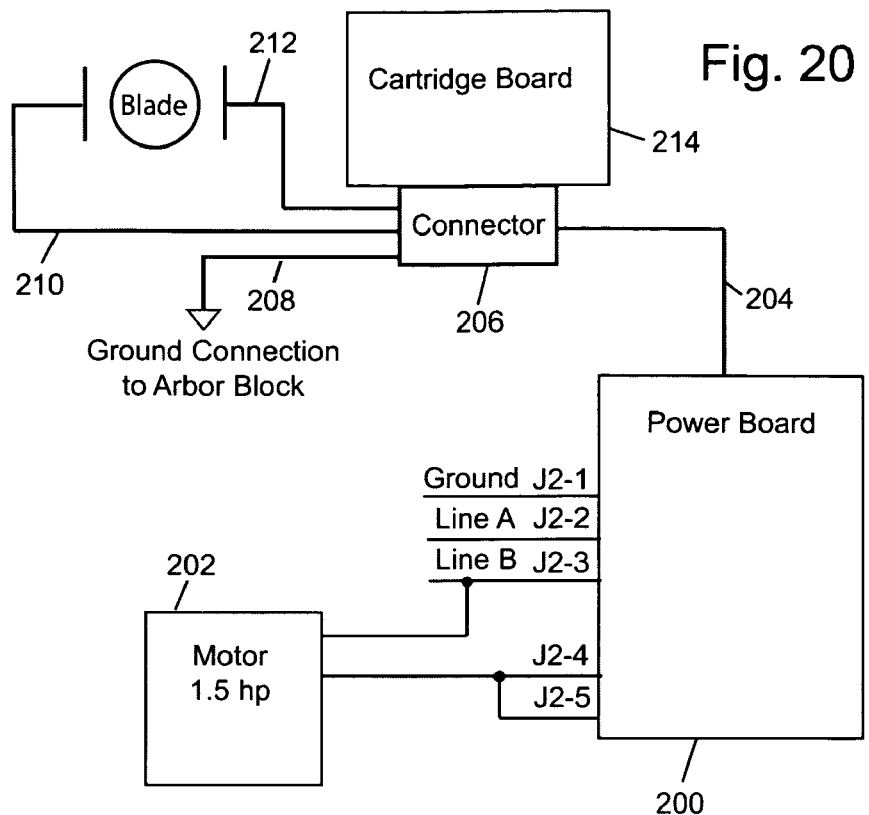
FIG. 20 is a diagram showing connections between components in machines using smaller motors.

FIG. 20 shows a high level view of how the circuits discussed above may be incorporated into a machine such as a saw having a relatively small motor (e.g., a 1.5 horsepower single phase motor). A power board 200, having a power supply circuit like the one disclosed in FIG. 19, may be housed in a switch box mounted on the machine. A ground connection and power Lines A and B are supplied to the power board at connections J2-1, J2-2, and J2-3, respectively. A motor 202 is connected to power Line B and to connector J2-5 which connects to power Line A on the power board. The power board turns on the motor by supplying power to the motor through connector J2-5.

Motor 202 and line J2-5 are also connected to line J2-4 as shown. That connection is used to sense whether a cutting tool in the machine is rotating, and the connection may be referred to as a zero-cross sensing connection. This circuit is detailed above and additional detail is disclosed in U.S. Provisional Patent Application Ser. No. 60/496,568, entitled "Motion Detecting System for Use in a Safety System for Power Equipment," the disclosure of which is herein incorporated by reference.

A cable 204 connects the power board to a connector 206. In the circuits discussed above, cable 204 is preferably a nine-conductor cable with a ground shield and connector 206 is a high-density, D-Sub style connector with 15 conductors.

Wires 208, 210 and 212 also connect to connector 206. Wire 208 is a ground wire attached to a portion of the machine such as an arbor block in a saw to insure a secure ground connection between the contact detection circuitry and the structure of the saw. Wires 210 and 212 connect to the electrodes used in the detection subsystem to impart a signal to a designated portion of the machine such as to the blade in a table saw, as discussed above.

One portion of connector 206 is mounted in the machine and another portion is mounted on a cartridge board 214 housed in a replaceable cartridge. The cartridge board may include the exemplary circuits shown in FIGS. 6 through 18, as stated. The connection between the two portions of connector 206 is made when the cartridge is installed in the machine.

In the circuits discussed above, the female portion of the connector would preferably be mounted in the machine and the male portion would preferably be mounted on the cartridge because the pins in the male portion are more easily damaged and it is easier to replace the cartridge than it is to replace the female portion of the connector which is mounted semi-permanently in the saw.

Figure 21:
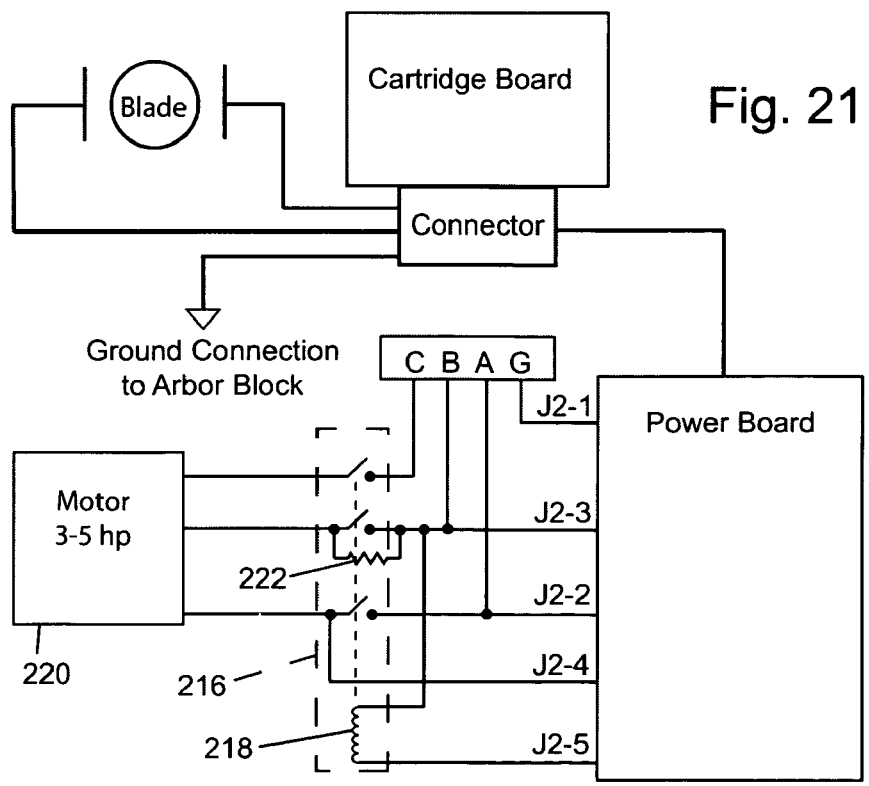
FIG. 21 is a diagram showing connections between components in machines using larger motors.

FIG. 21 shows how the circuits discussed above may be incorporated into a machine such as a saw having a larger motor (e.g., a 3 to 5 horsepower motor powered by either single or three-phase power). The connections between the power board, connector, cartridge board, electrodes and ground are similar to those shown in FIG. 20.

The power board is connected at line J2-1 to ground and to power lines A and B at J2-2 and J2-3, respectively. Power lines A and B and C are all connected to a contactor 216 having a coil 218, and the contactor is connected to motor 220. Coil 218 is connected to power line B and to connector J2-5, which selectively connects to power line A through the power board. Supplying power to coil 218 through connector J2-5 causes the contactor to close and supply power to the motor.

Line J2-4 is also connected to motor 220 and is used to sense whether a cutting tool in the machine is rotating. Again, this connection may be referred to as a zero-cross sensing connection. A 100 k resistor, labeled by the number 222, also connects motor 220 to connector J2-3 across the contactor, as shown, to provide a closed circuit path for the zero-cross sensing.

Figure 22:
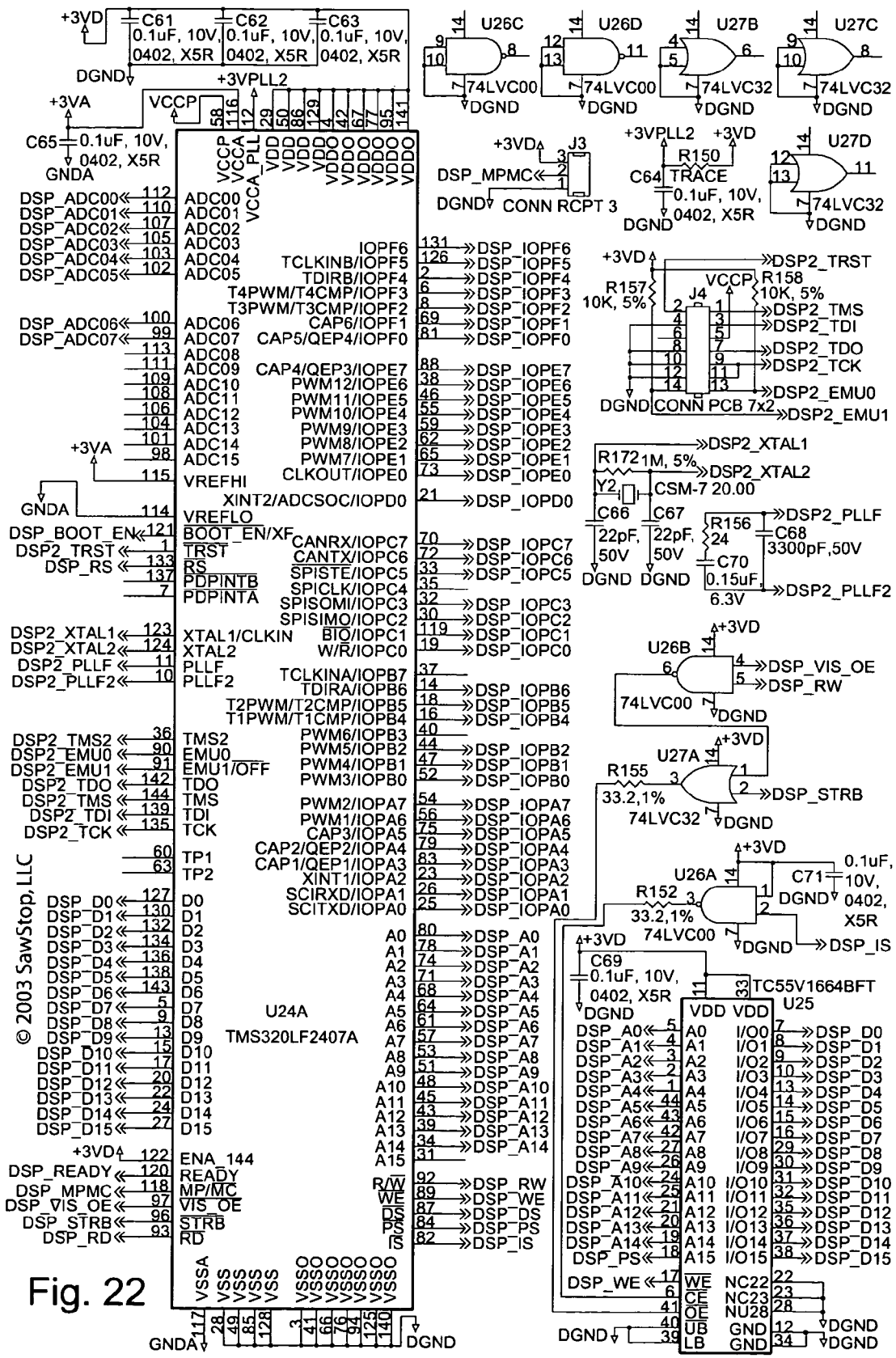
FIG. 22 is a diagram showing an alternative digital signal processor implementation.

Two copies of a computer program that is one implementation of the methods discussed above are being submitted concurrently on two compact discs as a Computer Program Listing Appendix. That program is incorporated into this document by reference. The computer program comprises a full description of the methods described herein, and is intended for operation with the circuits shown in FIGS. 6 through 19 and 22. The program is most specifically written in assembly language to run on a Texas Instruments TMS320LF2407A digital signal processor or on other similar processors. The schematic for this implementation is shown in FIG. 22, which would replace the schematics of FIGS. 8-13. The TMS320LF2407A has the capability to implement 64k of external RAM, as shown, which provides the opportunity for enhanced debugging capabilities, but does, so at the expense of occupying a larger area on the circuit board. Therefore, it is believed that the TMS320LF2403A is a preferred device to use in a production cartridge where space is very limited and the debugging capabilities are less important. Furthermore, if quantities justified the NRE cost, it is possible also to use a TMS320LC2402A, which is a ROM-coded device (no flash) that must be programmed at the time of manufacture, but is substantially cheaper once the initial ROM programming is completed.

It can be seen from examination of the attached computer code in combination with the above-described circuit that the disclosed system implements a wide variety of self-tests. In particular, the system tests the SCR and the circuit that drives the gate of the SCR at power up if the voltage on the capacitor is low enough that the fuse wire will not be degraded by firing the SCR and releasing the charge in the capacitor. The voltage as a function of time during the discharge is monitored to make sure that the SCR, capacitor and discharge path have a sufficiently low series resistance to cause the fuse wire to break if the discharge occurs at high voltage. Also, the time of the peak discharge current relative to the turn on pulse to the SCR is measured to monitored to verify the functionality of the SCR and gate drive circuitry.

After the SCR test is completed the high voltage energy storage capacitor is charged to its operational voltage. The first test is that this capacitor reaches the correct voltage level to have sufficient energy to burn the fuse wire. Once the capacitor reaches operational voltage, a short discharge under a known resistive load is carried out. The current in the discharge and the voltage drop on the capacitor during the discharge are both measured and cross-correlated with the operation voltage to insure that the capacitor has sufficient capacitance to burn the fuse wire when charged to the operational voltage. In addition, the measurement of discharge current provides a redundant direct measure of the voltage on the capacitor. Thus, if the resistive divider network that is used to sample the voltage on the high voltage capacitor is degraded in some way, the current measured during discharge will not match its expected value and an error can be set to warn the user of a failure in the circuit. This discharge test is preferably carried out periodically whenever the saw is powered up to insure that the high voltage capacitor is fully functional at all times.

As described above, the circuitry associated with turning on the relay to start the motor is redundant to provide the maximum reliability. In addition, the circuitry in association with the attached code provides a test to verify the operational condition of both transistors used to control the relay as part of the relay turn on process each time the motor is started. Should either transistor fail the test, then system will set an error and the motor will not start. Use of redundant series control elements, and functional testing of those elements, to control the operation of the motor minimizes the chances that a single failure can cause the motor to turn on in an uncontrolled fashion.

The bypass and start switches, described in the application incorporated by reference above titled "Switch Box for Power Tools with Safety System," that are part of the user interface also include a self-test function. In particular, when power is applied to the circuit, both the bypass and start switches must be in the off condition before an on condition will register with the system. For instance, if the start switch is inadvertently placed in the on condition prior to the application of power to the system, then when power is applied, an error will be set that will prevent the system from operating the motor until the start switch is cycled to the off position. The same is true of the status of the bypass switch. Also, the status of the switches is sampled multiple times prior to accepting a change of state. For instance, in order for the start switch to register as on, the system must sample the start switch multiple times over the course of many milliseconds or tens of milliseconds and find the switch in the on condition each time to recognize the start switch as being in the on condition. As illustrated in the attached code, similar functionality is incorporated into recognizing a turn off command on the start switch.

In addition, engagement of the bypass mode, wherein the contact detection system is temporarily disabled, is controlled by the bypass switch. In particular, as illustrated in the attached code, in order to engage the bypass mode, the bypass switch is turned and must be held for a first period of time prior to engaging the start switch. Then, once the start switch is engaged, the motor turns on and the bypass switch must continue to be held on for a second period of time. If this pattern is started but interrupted prior to completion, the motor will turn off if it is already on and the sequence must be started again from the beginning. The use of an activation pattern for the bypass insures that the bypass system will not be engaged by accident and that there will be no mistake as to whether the bypass was correctly engaged. In addition, once the bypass is engaged, the LED's in the user interface are illuminated in a predetermined fashion to indicate to the user visually that the bypass is engaged. It should be noted that the bypass switch is key controlled to allow a shop supervisor or other person to remove the key to prevent the system from being used in the bypass mode.

Numerous checks are built into the contact detection signal path as described in the circuit above when taken in combination with the attached code. First, the contact detection signal must generate a desired output at the integrator or the system will set an error and the motor will not start. Thus, if a wire is broken, or the blade is accidentally grounded, the operator will not be able to start the motor and an error code will be flashed on the LED's in the user interface.

In addition, the various detection schemes are monitored and if a background noise level causes the detection schemes to reach a level close to but not exceeding the trigger level, the system will shut off the saw without triggering the braking system to warn the user that a false trip is imminent. The system is configured to look at the level registered on the detection schemes as an average over a long enough time scale that actual contact events won't have any significant effect on the average. Therefore, it may be desirable to look at the average detection scheme level over a time of about 1 to 20 milliseconds or more, and 5 milliseconds is believed to be a particularly suitable average window length. This averaging can be accomplished easily in a microcontroller by use of a so-called infinite impulse response or IIR filter, as shown in the code. The word average is used herein in a more general sense than just the mathematically defined average and is thus meant more to convey a measure of the characteristic level of a signal over a period of time, such as by the just-described IIR. It can be see that tracking the response level of one or more of the detection schemes during operation and interrupting operation if the tracked response level exceeds some threshold less than the contact detection threshold, provides a method of reducing the chance of a false trip.

In addition to tracking the response level of the detection schemes, the attached code is configured to track the drive signal level and shut off the motor if the drive level required to maintain the sensed signal at the target level exceeds some threshold. This can occur if a user tries to cut extremely wet wood, for instance. Monitoring the drive level and shutting the motor off if the drive level exceeds a threshold level provides yet another method of reducing the chance of false trip and provides a method to insure that the motor only continues to operate so long as contact can reliably be detected. Given the various component tolerances, it may be desirable to calibrate the nominal drive level at the time of manufacture to provide a more accurate measure of the actual drive level required under nominal conditions to have the sensed signal in regulation. The ratio of the current drive level to this nominal drive level is the preferred control off of which the drive level motor turn off threshold and the contact detection threshold are adjusted.

The attached code also embodies tracking of the AGC regulation. In particular, the AGC is designed to maintain the nominal sensed signal at a predetermined level. If the sensed signal deviates from that level, an AGC error is generated. This error is tracked and averaged on a time scale longer than tooth strike events to insure that the AGC is in regulation. If the average or characteristic level of the AGC error is greater than some threshold when computed over a sufficiently long time, then an error is set which prevents operation of the motor or causes it to turn off if it is already on.

As described above, the disclosed embodiment includes a circuit to detect the spacing between the pawl and the saw blade. This test is used to insure that the operator doesn't attempt to operate the saw with a blade that is too small for the installed cartridge, such as an 8" blade instead of a 10" blade, or with a blade that has a non-conductive hub. This can also be used to insure that the brake pawl is positioned close enough to the blade if a spacing adjustment is provided.

The voltage level of the power supply line powering the cartridge board circuitry is also monitored to insure that it is neither too high nor too low. If the level goes too low, that may be indicative of a loss or degradation in power in which case the motor can be shut off or blocked from starting to minimize the danger to the user under those circumstances.

FIGS. 23-28 show alternative embodiments of the circuits shown in FIGS. 7-18. Since the alternative embodiments are similar in many respects and the differences are apparent from a detailed study of the respective circuit schematics, only the more significant changes will be described more specifically.

Figure 23:
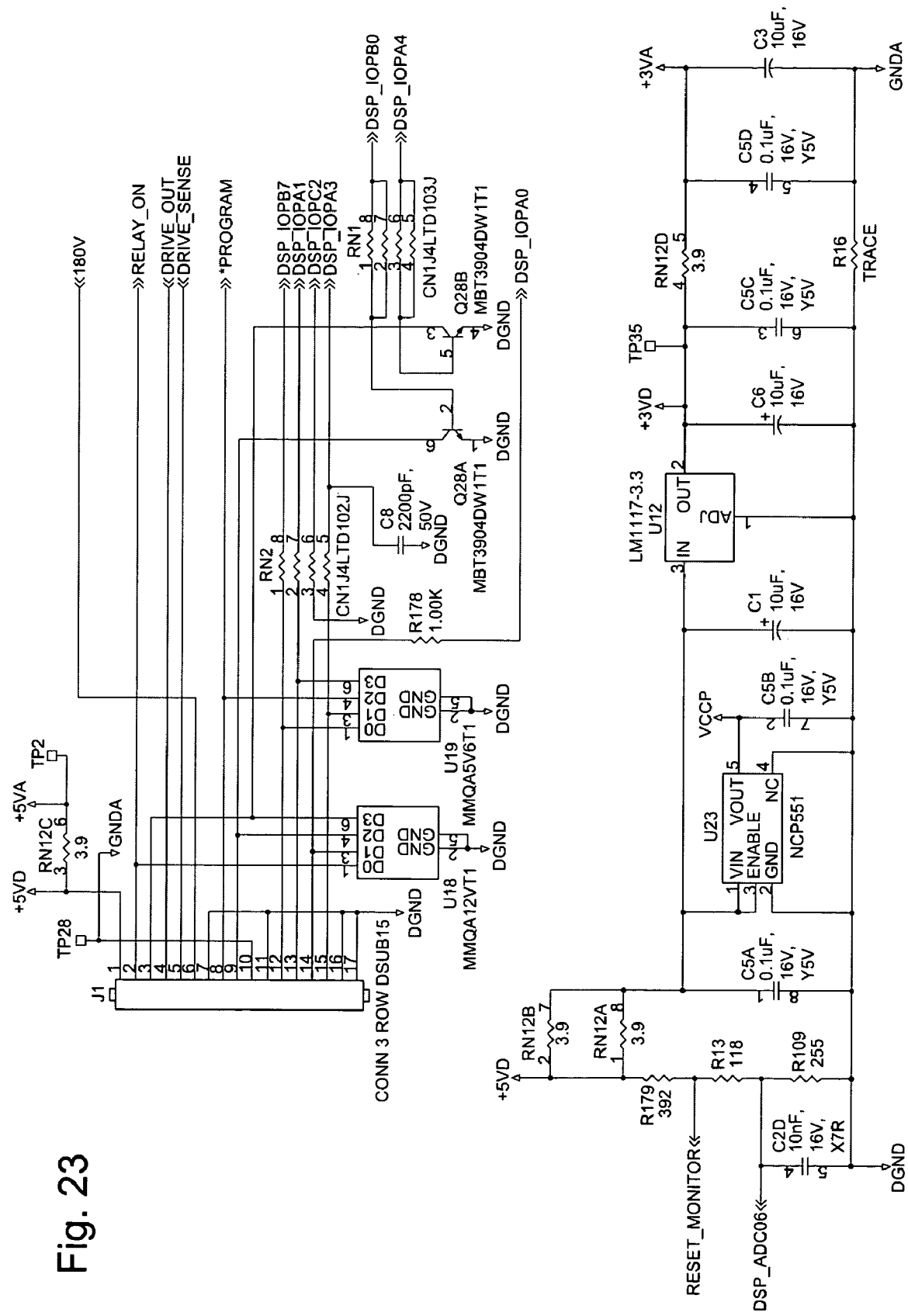
FIGS. 23-28 show alternative embodiments of the circuits shown in FIGS. 7-18.

First, in FIG. 23, J1 pin 14 is connected to DSP pin IOPA0, which is the Serial Communications Interface transmit pin. By connecting this pin and modifying the software appropriately, the DSP can communicate with a personal computer via a serial port. More particularly, the DSP can be configured to read out some or all of its memory one time or cyclically, whereby it is possible to monitor the state of various parameters while operating the tools. This makes it far easier to monitor the effect of various external events or conditions on the operation of the DSP. Furthermore, it is possible to configure the DSP to store data from a contact event, as described above in some programmable memory and then read out that stored data via the serial communications interface described above. This facilitates quick analysis of any event that registered as contact. By providing access to the serial communications interface on the DSP, it is also possible to program the DSP via the serial port, which provide a quick and convenient way to accomplish this programming.

Figure 24:
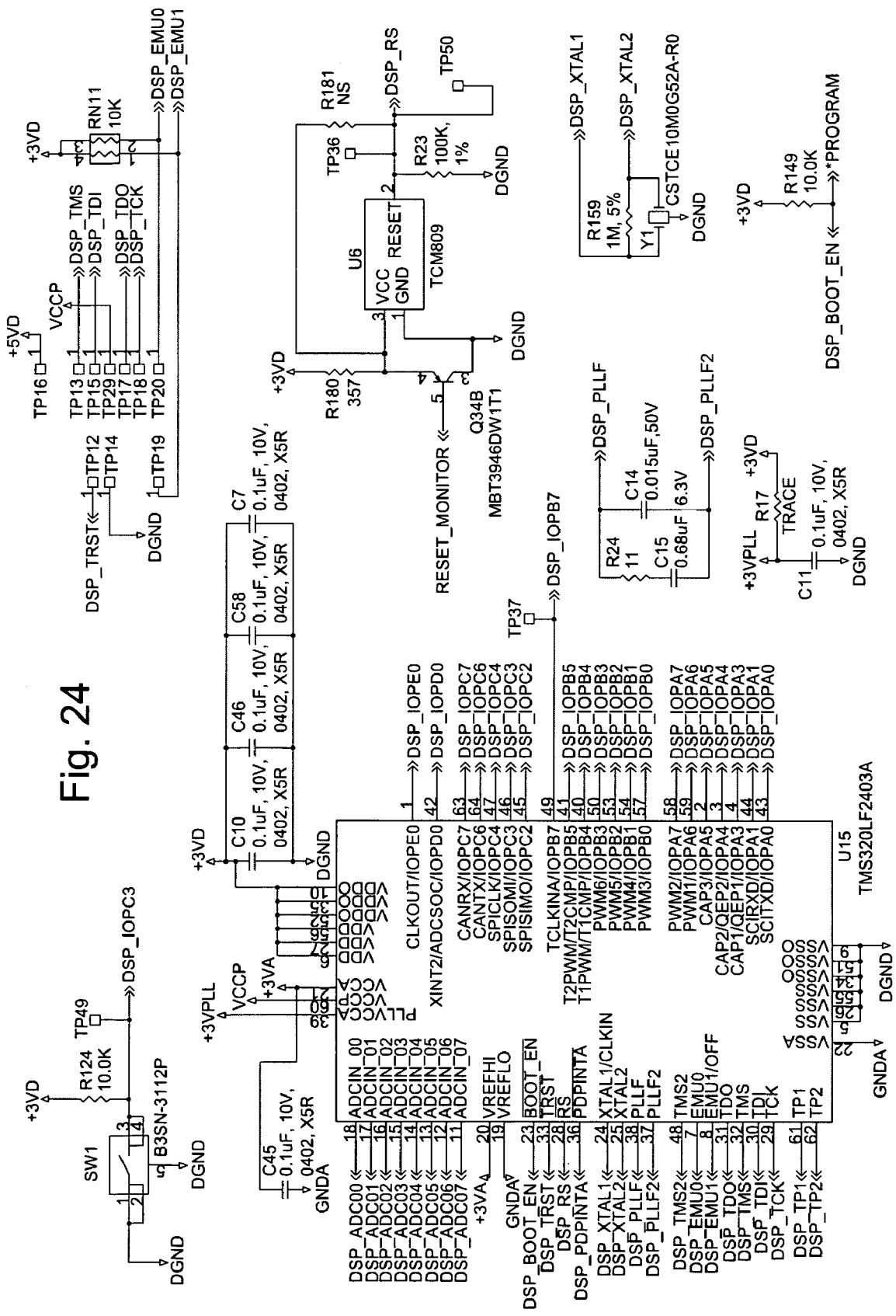
Figure 25:
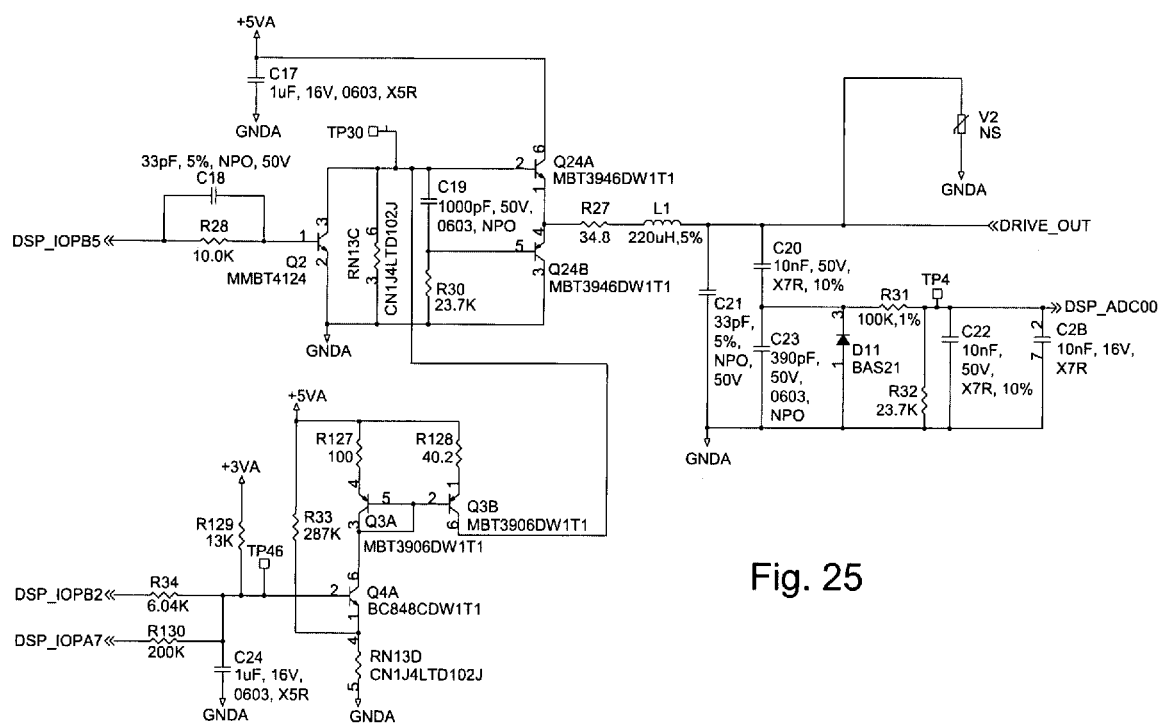

As shown in FIG. 24, the crystal oscillator shown in FIG. 10 has been replaced with a ceramic resonator. Although the ceramic resonator is not typically as accurate as a crystal, it is far more mechanically robust against vibration or other shock, such as might be found in power tools or occur during sonic welding, for instance. As a second alternative, it is also possible to use a solid-state oscillator, which is typically the least accurate, but provides the best possible mechanical durability.

Figure 26:
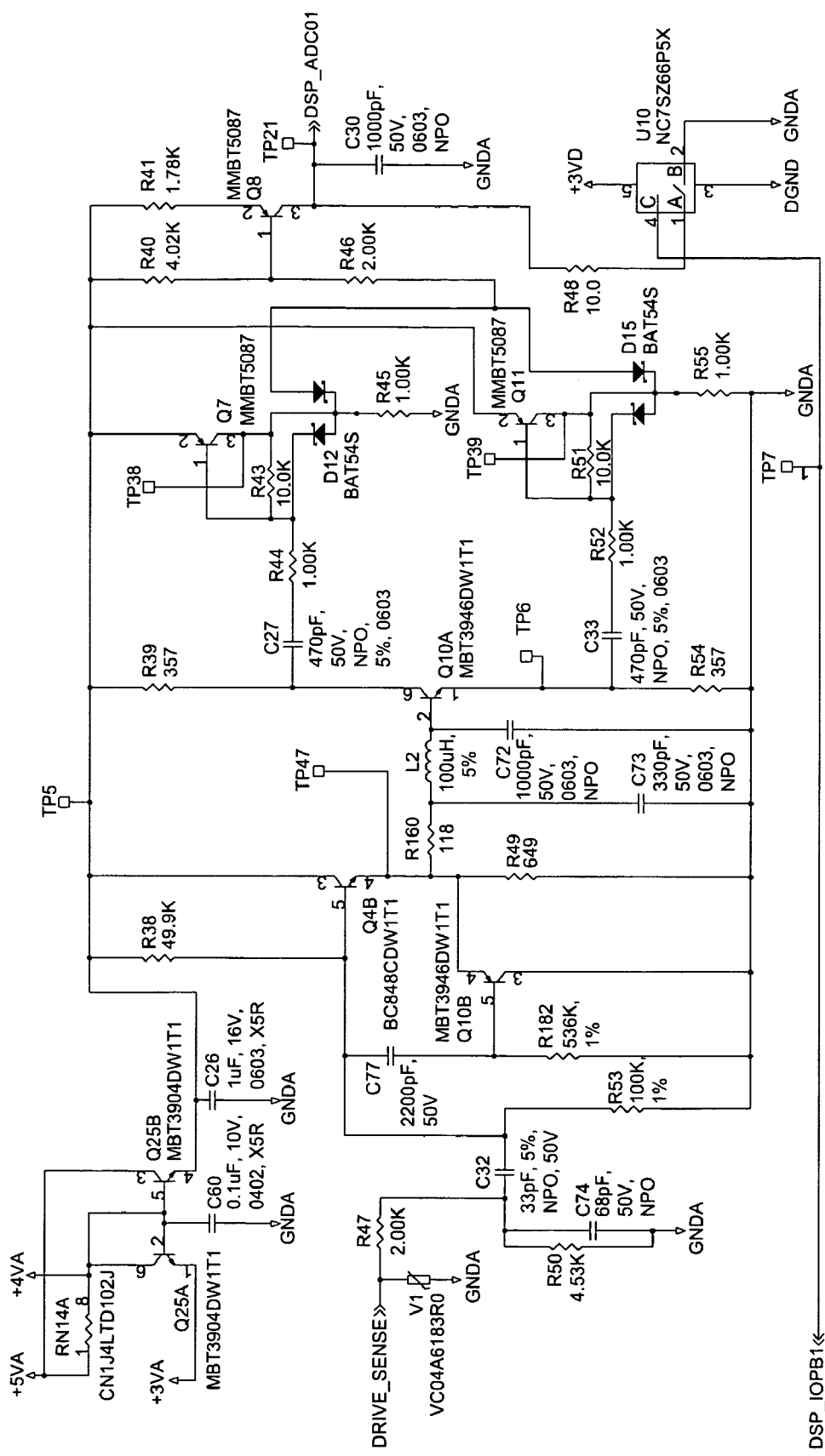

FIG. 26 illustrates an alternative embodiment of the integrator circuit of FIG. 15. The circuit of FIG. 26 provides better input signal protection in that strong noise events do not cause the signal of interest to be clipped, as would occur with D23 of FIG. 15. In particular, transistor Q10B acts to clip large excursions, but does not affect the transmitted 500 khz signal unless the noise is very large.

Figure 27:
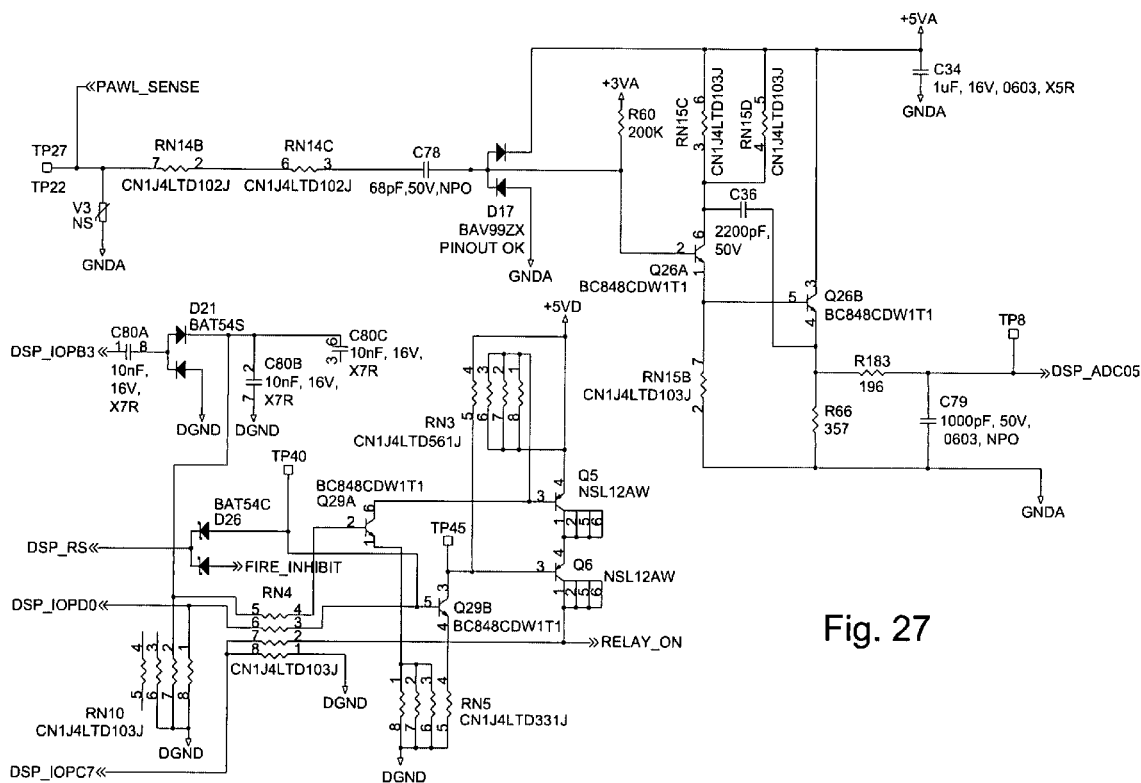

FIG. 27 illustrates an alternative embodiment of the circuit of FIG. 16. The circuit of FIG. 27 requires fewer components and is less sensitive to the effect of any flux or other contamination on the board that might affect the surface impedance of the board. This circuit has particularly high input impedance and would otherwise be very sensitive to the effect of any contamination on the PCB, such as might occur due to inadequate cleaning during assembly.

FIG. 27 also illustrates an alternative embodiment of the circuit of FIG. 17. The circuit of FIG. 27 offers the advantage that it requires a continuing pulse train from the DSP to keep transistor Q5 in its conductive state. For instance, Q5 cannot be turned on by the DSP simply turning IOPB3 on or off. It must cycle continuously in order to turn Q5 on. This is beneficial because it is possible for the DSP fail due to an internal fault or due to failure of the external oscillator, such as the crystal, and the circuit of FIG. 27 will shut off the motor of the power tool in that event.

Figure 28:
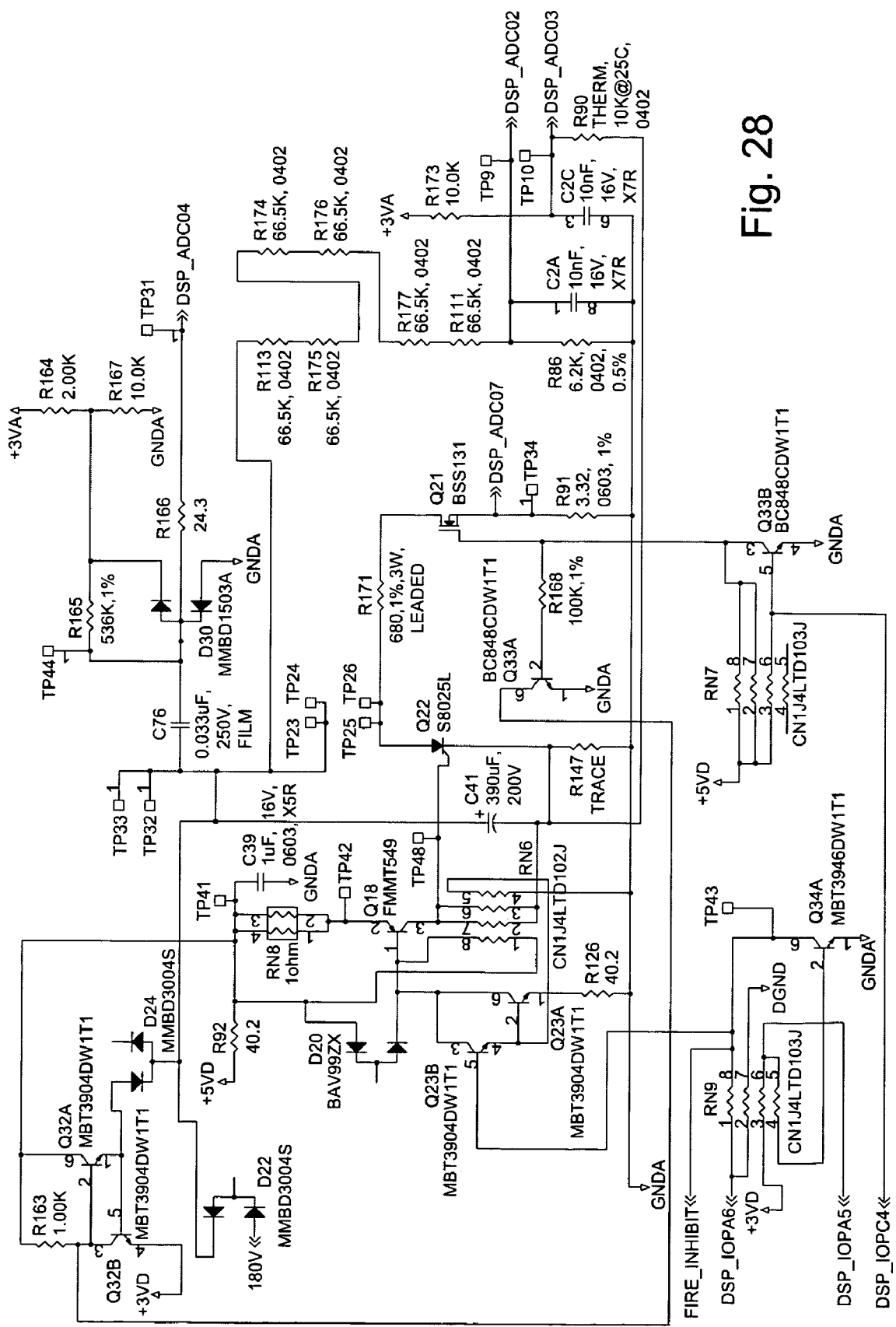

FIG. 28 illustrates an alternative embodiment of the circuit of FIG. 18. The circuit of FIG. 28 provides a temperature sensor, in the form of thermistor R90, which forms a divider network with resistor R173. The node between R90 and R173 is connected to one of the ADC inputs to the DSP so that the DSP can sample the voltage at that node and thereby monitor the temperature of the thermistor. Thermistor R90 is preferably placed in thermal contact with capacitor C41 to thereby more directly reflect the temperature of C41. A suitable value for C41 is 1000 uF to provide additional energy to burn the fuse wire as described above. C41 is typically an electrolytic capacitor and the performance of such capacitors falls off as their temperature drops. By thermally connecting R90 to C41 it is possible to accurately monitor the temperature of C41 to insure that its temperature is sufficiently high that it will have sufficient energy to burn the fuse wire if necessary.

Also related to C41, the discharge test resistors R171, R106 and R70 of FIG. 18 have been replaced with a single 3 W 680 ohm leaded resistor R171 in FIG. 28. R171 is placed in thermal contact with capacitor C41. One way of achieving such a thermal contact is to place R171 adjacent to C41 and apply a thermally conductive compound between them so that heat can be transferred from R171 to C41. With the described configuration, it is possible to heat C41 using R171 to bring C41 to a satisfactory operating temperature.

It is possible to configure the DSP to track the temperature of C41 via thermistor R90 and then trigger more frequent discharges through R171 to increase its heat output as necessary to bring C41 to a suitable operating temperature. In one implementation of this technique, the DSP tracks the temperature registered by R90. If the temperature is below a low threshold where sufficient energy delivery from C41 to burn the fuse wire cannot be guaranteed, the DSP triggers frequent discharges through R171, sufficient for instance for R171 to dissipate 2 W and thereby rapidly heat C41. At a second threshold temperature, the DSP will trigger discharges through R171 sufficient to generate approximately 1 W of heat dissipation, which is sufficient to raise the temperature of the capacitor 10-20 degrees above the ambient temperature to increase the energy available for delivery the fuse fire. At a third "normal" temperature, the DSP only triggers period discharges through R171 as necessary for testing the capacitance and far less than 1 W. The specific details of the discharge periods and duty cycles are set forth in the attached code.

It should also be noted that resistors R111 and R113 of FIG. 18 have been split into resistors R11, R113, R174, R175, R176 and R177 to reduce the effect of any impedance changes induced by board contamination in the area of the divider network.

The attached code, PROGRAM2.ASM, embodies a number of changes from the earlier submitted PROGRAM.ASM. Some changes are specific to the circuit modifications that have been described above, such as the toggling one of the relay control lines rather than controlling it with a simple on/off state, and adding functionality to monitor the temperature and control the capacitor heating. Other modifications include changes to reduce the sensitivity to noise from contactor arcing at startup and shut down, by for instance requiring two threshold detection events separated by a period of time to register as contact. In this way, a single perturbation of the detected signal, not matter how large, would be sufficient to trigger a contact event unless it is detected during two times separated by, for instance 1 millisecond and less than say 10 milliseconds.

The motor start logic has also been modified to allow the motor to be jogged without the blade to allow determination of the direction of arbor rotation prior to installation of the blade. In three phase saws, the motor may spin in either direction depending on the wiring hook up and this feature allows the user to determine the rotation without the blade attached. If the blade is attached and the motor starts running backwards, it is possible for the blade to unthread the nut and spin off. Therefore, it is beneficial to be able to test rotation without the blade in place. The motor jog feature tests for an error in the blade to pawl spacing detection to insure that no blade is present before allowing the motor to jog. Further-more, the control of the motor jogging is done through the bypass key input, so that the user is less likely accidentally jog the motor.

The attached code also illustrates the capability of storing the data that lead to a contact detection event to flash memory and reading that data back via the serial port after a fire event. Among the data tracked and stored is the power on time, the number of power cycles of the motor that have occurred since power was applied to the circuit and how long the motor had been running when the fire event occurred. Tracking these state conditions further facilitates diagnosis of actual or false fire events.

When the system is first powered up, the attached code uses the impedance characteristics of the blade sensed at power up to reset a nominal drive level value. This value is used to determine whether there is any electrical loading of the blade such as might be present if a user was in contact with the blade. Since any loading of the blade causes the signal to go down and/or the drive level to go up, by looking at the current drive level relative to the nominal drive level, the system can tell whether a person might be contacting the blade and not allow the motor to start if that is the case. The nominal drive level can change with temperature and time and therefore is preferably adjusted over time to track the correct value. The disclosed algorithms do this in an asymmetric fashion. In particular, the nominal drive level will track downward changes relatively quickly, while responding to upward changes relatively slowly. The reason for this asymmetry is that virtually all externally induced changes to the signal on the blade cause the nominal drive level to go up, so that if we see a drop in the current drive level, we can have some confidence that it was as a result of removal of an externally induced load on the blade or drift of the properties of electrical components and that such changes should be reflected in the nominal drive level. However, increases in the actual drive level, on the other hand, could be due to cutting wet wood, and that should increase in drive level should not be reflected in the nominal drive level, which is supposed to be the expected drive level with not such perturbations. The various contact detection thresholds can be scaled up or down based on the relationship between the actual and nominal drive levels to maintain the desired sensitivity.

Another feature is the provision of maximum single step clipping in the detection code. The reason for this is that actual contact events only cause the signal to drop by a relatively small amount per sample—for instance, several percent maximum. By examining the change, from sample to sample and clipping the maximum change to a maximum permitted value, it is possible to obtain improved resistance to noise induced fluctuation on the detection signal. Additional changes will be apparent from detailed examination of the attached code.

INDUSTRIAL APPLICABILITY

The systems and components disclosed herein are applicable to power equipment and to safety systems that detect human contact with power equipment.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. No single feature, function, element or property of the disclosed embodiments is essential to all of the disclosed inventions. Similarly, where the claims recite "a" or "a first" element of the equivalent thereof, such claims should be understood to include incorporation of one or more such elements, neither requiring nor excluding two or more such elements.

It is believed that the following claims particularly point out certain combinations and sub-combinations that are directed to one of the disclosed inventions and are novel and non-obvious. Inventions embodied in other combinations and sub-combinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A memory device for use in a woodworking machine having a safety system designed to detect a dangerous condition between a human and a dangerous portion of the woodworking machine and to trigger some action to mitigate the dangerous condition, the memory device comprising:
 a module configured to be positioned within a woodworking machine and, further configured to be removable from the woodworking machine, where the module includes a housing;
 permanent memory within the housing; and
 a system to store data to the permanent memory, where the data indicates the cause of the trigger of the action to mitigate the dangerous condition.

2. The memory device of claim 1, where the permanent memory is flash memory.

3. The memory device of claim 2, where the flash memory is part of a digital signal processor.

4. The memory device of claim 1, where the woodworking machine is a table saw.

5. The memory device of claim 1, where the dangerous portion is a blade.

6. A memory device for use in a woodworking machine having a safety system designed to detect a dangerous condition between a human and a dangerous portion of the woodworking machine by imparting an electrical signal to the dangerous portion and monitoring that signal for predetermined changes indicative of the dangerous condition, and where the safety system is further designed to trigger some action to mitigate the dangerous condition upon detection of the predetermined changes in the electrical signal indicative of the dangerous condition, the memory device comprising:
 a module configured to be positioned within a woodworking machine and further configured to be removable from the woodworking machine, where the module includes a housing;
 permanent memory within the housing; and
 a system to store data to the permanent memory, where the data includes at least the predetermined changes in the electrical signal that caused the safety system to trigger the action to mitigate the dangerous condition.

7. A woodworking machine comprising:
 a cutting tool for cutting workpieces;
 at least one motor configured to drive the cutting tool;
 a detection system configured to detect a dangerous condition associated with the cutting tool by imparting an electrical signal on a portion of the woodworking machine and monitoring the electrical signal for predetermined changes indicative of the dangerous condition;
 a reaction system triggerable to perform some action to mitigate the dangerous condition when the detection system detects the predetermined changes in the electrical signal indicative of the dangerous condition;
 permanent nonvolatile memory; and
 a system to store data to the permanent nonvolatile memory, where the data includes the predetermined changes in the electrical signal that cause the triggering of the reaction system.

8. The woodworking machine of claim 7, where the dangerous condition is contact between a human and the cutting tool.

9. The woodworking machine of claim 7, where the dangerous condition is proximity between a human and the cutting tool.

* * * * *